United States Patent
Wang et al.

(10) Patent No.: US 12,432,730 B2
(45) Date of Patent: Sep. 30, 2025

(54) MULTI-TRANSPORT BLOCK SIDELINK SCHEDULING

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US); Xiaoxia Zhang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 17/650,171

(22) Filed: Feb. 7, 2022

(65) Prior Publication Data

US 2023/0254861 A1    Aug. 10, 2023

(51) Int. Cl.
*H04W 72/12*  (2023.01)
*H04W 72/20*  (2023.01)
*H04W 72/121* (2023.01)
*H04W 72/40*  (2023.01)

(52) U.S. Cl.
CPC .......... *H04W 72/20* (2023.01); *H04W 72/121* (2013.01); *H04W 72/40* (2023.01)

(58) Field of Classification Search
CPC ... H04W 72/20; H04W 72/121; H04W 72/40; H04W 72/23; H04W 72/1263; H04W 72/0446; H04W 28/086
USPC .......................................................... 370/329
See application file for complete search history.

(56) References Cited

U.S. PATENT DOCUMENTS

| | | | |
|---|---|---|---|
| 2020/0305126 A1* | 9/2020 | Li | H04L 1/1614 |
| 2021/0007096 A1* | 1/2021 | Huang | H04L 1/1887 |
| 2021/0227465 A1* | 7/2021 | Kung | H04W 52/0216 |
| 2021/0243731 A1* | 8/2021 | Shin | H04L 5/0094 |
| 2022/0247539 A1* | 8/2022 | Luo | H04L 1/1854 |
| 2022/0256557 A1* | 8/2022 | Kang | H04L 67/12 |
| 2022/0322296 A1* | 10/2022 | Yu | H04L 1/1861 |
| 2022/0330209 A1* | 10/2022 | Ding | H04W 28/086 |
| 2022/0346118 A1* | 10/2022 | Wu | H04L 5/0044 |
| 2023/0006775 A1* | 1/2023 | Lee | H04W 72/21 |
| 2023/0071226 A1* | 3/2023 | Liu | H04L 1/1896 |
| 2023/0089655 A1* | 3/2023 | Yeo | H04L 5/0092 370/329 |
| 2023/0216614 A1* | 7/2023 | Wang | H04L 1/1822 370/329 |
| 2023/0370210 A1* | 11/2023 | Grieco | H04L 1/1854 |
| 2024/0106575 A1* | 3/2024 | Salim | H04L 1/1864 |

* cited by examiner

*Primary Examiner* — Jungwon Chang
(74) *Attorney, Agent, or Firm* — Harrity & Harrity

(57) ABSTRACT

Various aspects of the present disclosure generally relate to wireless communication. In some aspects, a user equipment (UE) may receive, from a network node, scheduling information that indicates resource allocations for transmitting multiple sidelink transport blocks (TBs) and one or more receiving UEs associated with the multiple sidelink TBs. The UE may transmit one or more sidelink TBs of the multiple sidelink TBs based at least in part on the resource allocations and the one or more receiving UEs indicated in the scheduling information. Numerous other aspects are described.

30 Claims, 16 Drawing Sheets

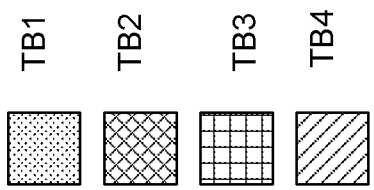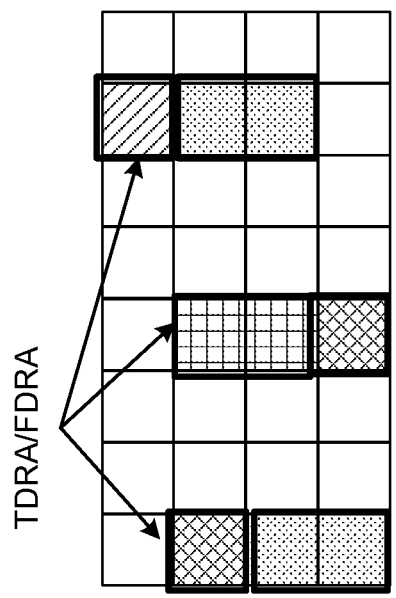
FIG. 10

MULTI-TRANSPORT BLOCK SIDELINK SCHEDULING

FIELD OF THE DISCLOSURE

Aspects of the present disclosure generally relate to wireless communication and to techniques and apparatuses for multi-transport block (TB) sidelink scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-12 are diagrams illustrating examples associated with multi-transport block (TB) sidelink scheduling, in accordance with the present disclosure.

SUMMARY

Figure 1:
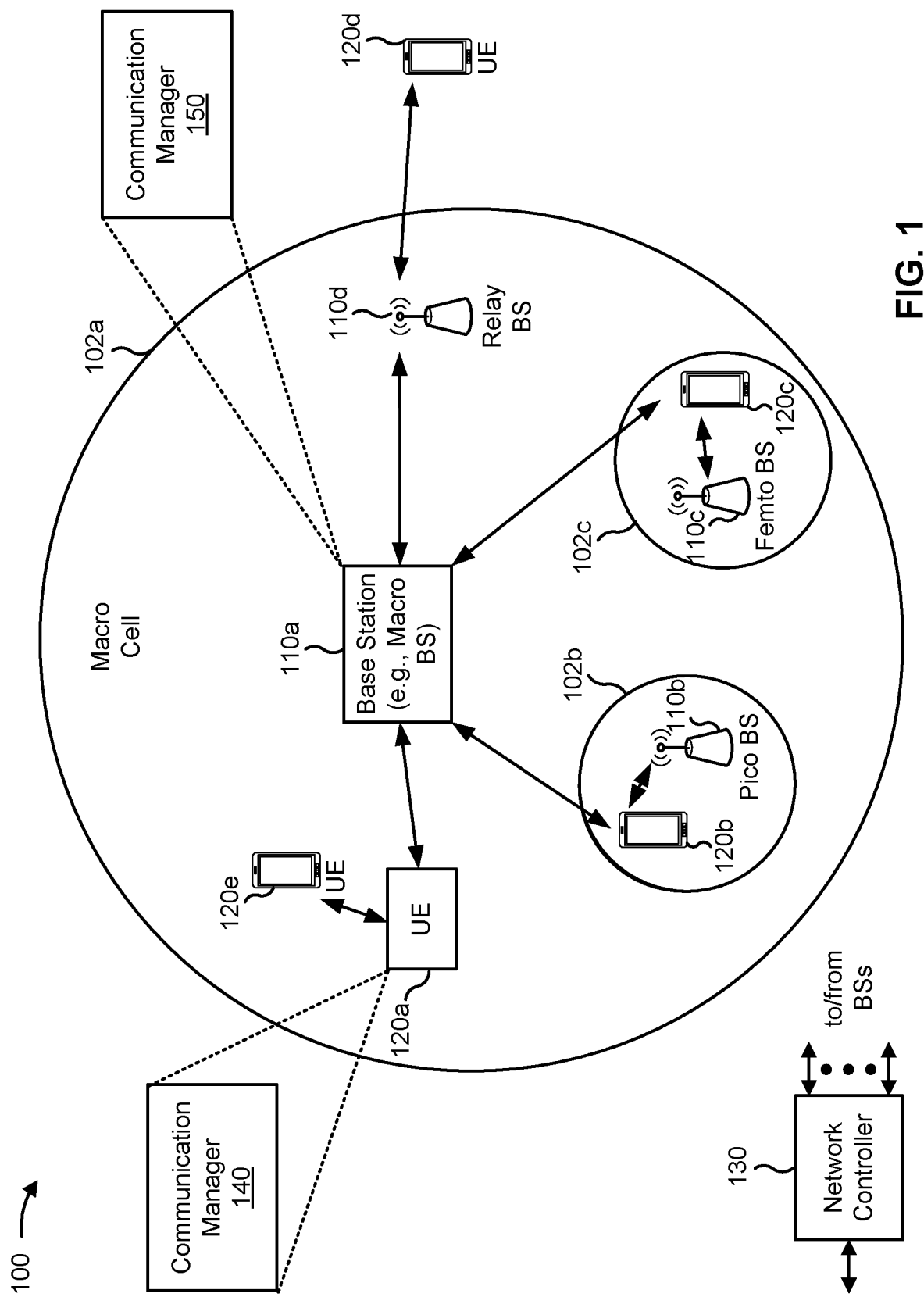
FIG. 1 is a diagram illustrating an example of a wireless network, in accordance with the present disclosure.

Some aspects described herein relate to a user equipment (UE) for wireless communication. The UE may include a memory and one or more processors coupled to the memory. The one or more processors may be configured to receive, from a network node, scheduling information that indicates resource allocations for transmitting multiple sidelink transport blocks (TBs) and one or more receiving UEs associated with the multiple sidelink TBs. The one or more processors may be configured to transmit one or more sidelink TBs of the multiple sidelink TBs based at least in part on the resource allocations and the one or more receiving UEs indicated in the scheduling information.

Some aspects described herein relate to a network node for wireless communication. The network node may include a memory and one or more processors coupled to the memory. The one or more processors may be configured to transmit, to one or more UEs, scheduling information that indicates resource allocations for transmissions of multiple sidelink TBs and one or more receiving UEs associated with the multiple sidelink TBs. The one or more processors may be configured to receive physical uplink control channel (PUCCH) feedback associated with the transmissions of the multiple sidelink TBs.

Some aspects described herein relate to a method of wireless communication performed by a PUCCH. The method may include receiving, from a network node, scheduling information that indicates resource allocations for transmitting multiple sidelink TBs and one or more receiving UEs associated with the multiple sidelink TBs. The method may include transmitting one or more sidelink TBs of the multiple sidelink TBs based at least in part on the resource allocations and the one or more receiving UEs indicated in the scheduling information.

Some aspects described herein relate to a method of wireless communication performed by a network node. The method may include transmitting, to one or more UEs, scheduling information that indicates resource allocations for transmissions of multiple sidelink TBs and one or more receiving UEs associated with the multiple sidelink TBs. The method may include receiving PUCCH feedback associated with the transmissions of the multiple sidelink TBs.

Some aspects described herein relate to a non-transitory computer-readable medium that stores a set of instructions for wireless communication by a PUCCH. The set of instructions, when executed by one or more processors of the UE, may cause the UE to receive, from a network node, scheduling information that indicates resource allocations for transmitting multiple sidelink TBs and one or more receiving UEs associated with the multiple sidelink TBs. The set of instructions, when executed by one or more processors of the UE, may cause the UE to transmit one or more sidelink TBs of the multiple sidelink TBs based at least in part on the resource allocations and the one or more receiving UEs indicated in the scheduling information.

Some aspects described herein relate to a non-transitory computer-readable medium that stores a set of instructions for wireless communication by a network node. The set of instructions, when executed by one or more processors of the network node, may cause the network node to transmit, to one or more UEs, scheduling information that indicates resource allocations for transmissions of multiple sidelink TBs and one or more receiving UEs associated with the multiple sidelink TBs. The set of instructions, when executed by one or more processors of the network node, may cause the network node to receive PUCCH feedback associated with the transmissions of the multiple sidelink TBs.

Some aspects described herein relate to an apparatus for wireless communication. The apparatus may include means for receiving, from a network node, scheduling information that indicates resource allocations for transmitting multiple sidelink TBs and one or more receiving UEs associated with the multiple sidelink TBs. The apparatus may include means for transmitting one or more sidelink TBs of the multiple sidelink TBs based at least in part on the resource allocations and the one or more receiving UEs indicated in the scheduling information.

Some aspects described herein relate to an apparatus for wireless communication. The apparatus may include means for transmitting, to one or more UEs, scheduling information that indicates resource allocations for transmissions of multiple sidelink TBs and one or more receiving UEs associated with the multiple sidelink TBs. The apparatus may include means for receiving PUCCH feedback associated with the transmissions of the multiple sidelink TBs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, scheduling information that indicates resource allocations for transmitting multiple sidelink transport blocks (TBs) and one or more receiving UEs associated with the multiple sidelink TBs; and transmit one or more sidelink TBs of the multiple sidelink TBs based at least in part on the resource allocations and the one or more receiving UEs indicated in the scheduling information. Additionally, or alternatively, the communication manager 140 may perform one or more other operations described herein.

In some aspects, the network node (e.g., a base station 110 or one or more components described in connection with FIG. 3) may include a communication manager 150. As described in more detail elsewhere herein, the communication manager 150 may transmit, to one or more UEs, scheduling information that indicates resource allocations for transmissions of multiple sidelink TBs and one or more receiving UEs associated with the multiple sidelink TBs; and receive physical uplink control channel (PUCCH) feedback associated with the transmissions of the multiple sidelink TBs. Additionally, or alternatively, the communication manager 150 may perform one or more other operations described herein.

As indicated above, FIG. 1 is provided as an example. Other examples may differ from what is described with regard to FIG. 1.

Figure 2:
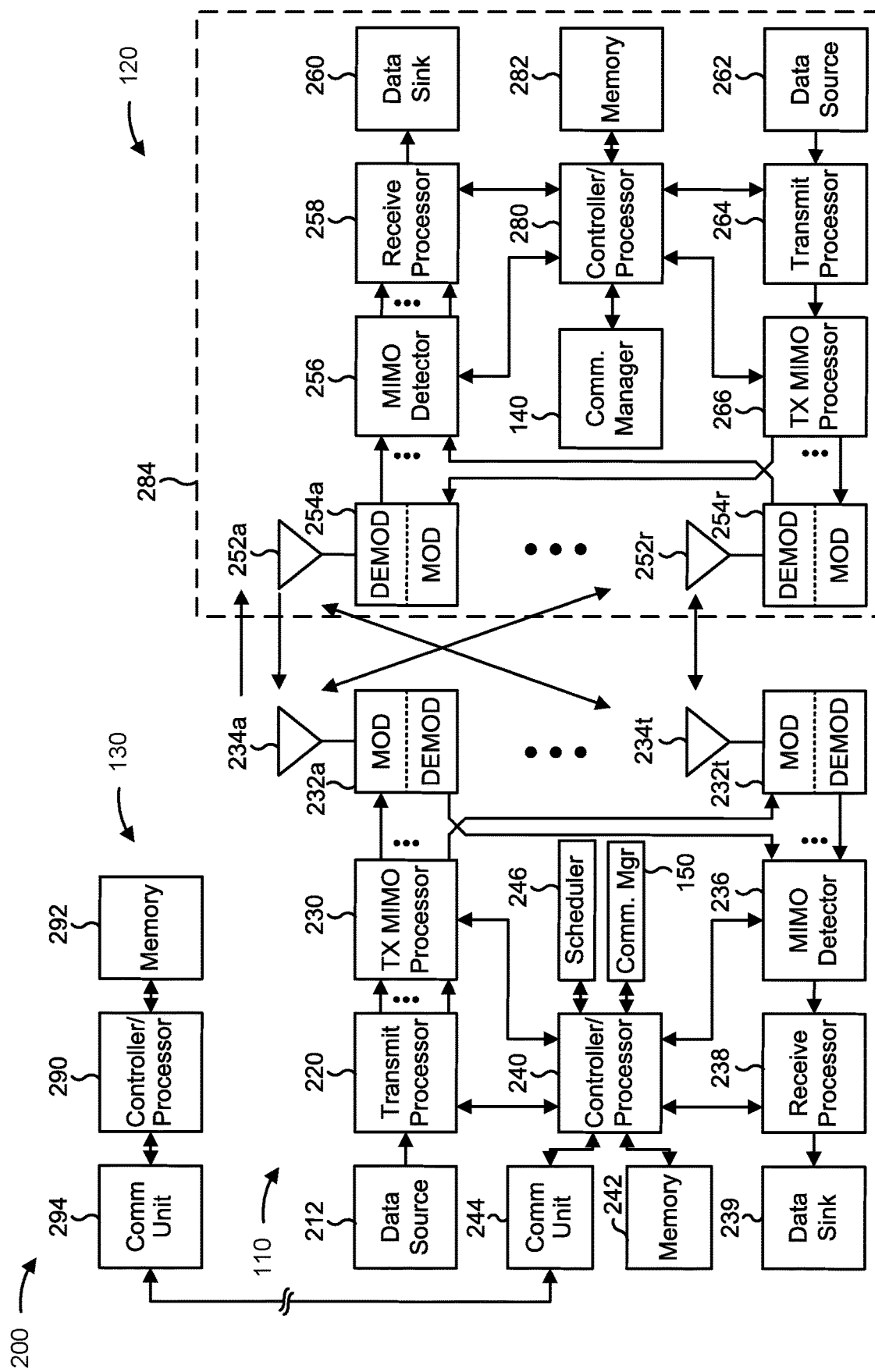
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-16).

The controller/processor 240 of the base station 110, the controller/processor 280 of the UE 120, and/or any other component(s) of FIG. 2 may perform one or more techniques associated with multi-TB sidelink scheduling, as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples. In some aspects, a network node described herein is the base station 110, is included in the base station 110, or includes one or more components of the base station 110 shown in FIG. 2.

In some aspects, the UE 120 includes means for receiving, from a network node, scheduling information that indicates resource allocations for transmitting multiple sidelink TBs and one or more receiving UEs associated with the multiple sidelink TBs; and/or means for transmitting one or more sidelink TBs of the multiple sidelink TBs based at least in part on the resource allocations and the one or more receiving UEs indicated in the scheduling information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node includes means for transmitting, to one or more UEs, scheduling information that indicates resource allocations for transmissions of multiple sidelink TBs and one or more receiving UEs associated with the multiple sidelink TBs; and/or means for receiving PUCCH feedback associated with the transmissions of the multiple sidelink TBs. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
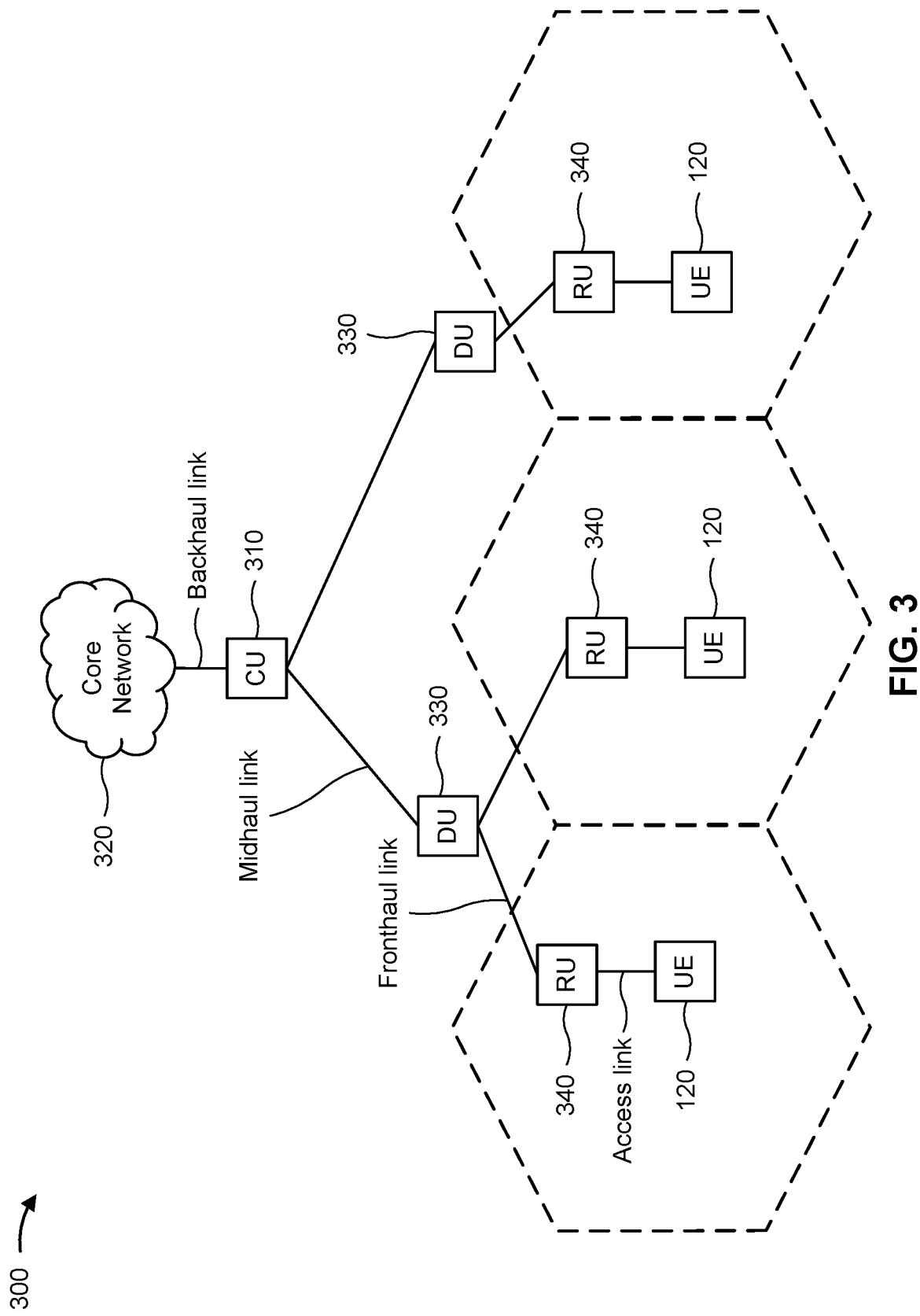
FIG. 3 is a diagram illustrating an example of an open radio access network (O-RAN) architecture, in accordance with the present disclosure.

FIG. 3 is a diagram illustrating an example 300 of an open radio access network (O-RAN) architecture, in accordance with the present disclosure. As shown in FIG. 3, the O-RAN architecture may include a control unit (CU) 310 that communicates with a core network 320 via a backhaul link. Furthermore, the CU 310 may communicate with one or more distributed units (DUs) 330 via respective midhaul links. The DUs 330 may each communicate with one or more RUs 340 via respective fronthaul links, and the radio unit (RUs) 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
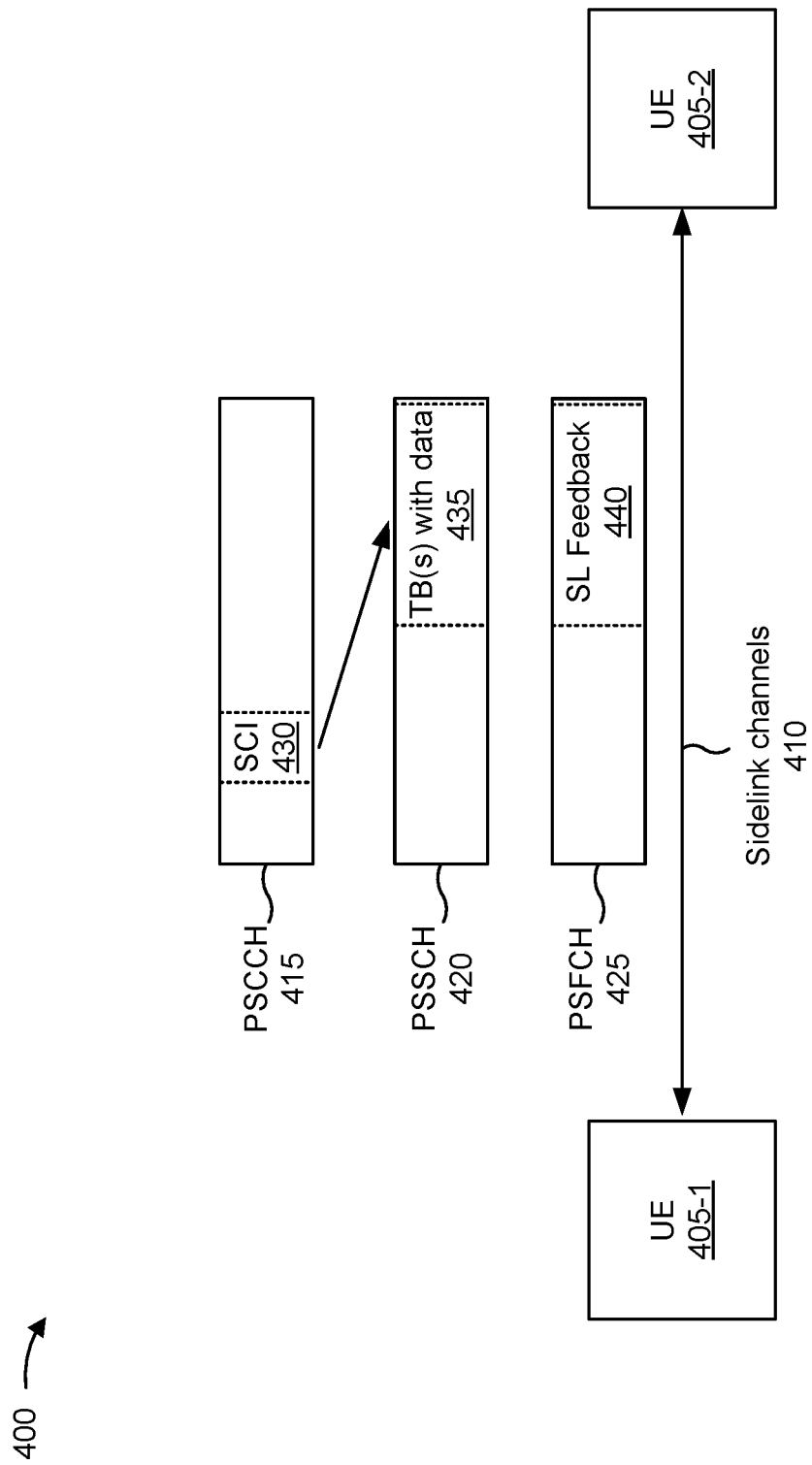
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some examples, the UEs 405 (e.g., UE 405-1 and/or UE 405-2) may correspond to one or more other UEs described elsewhere herein, such as UE 120. In some examples, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a PUCCH used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a TB 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), and/or a scheduling request (SR).

Although shown on the PSCCH 415, in some examples, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some examples, the one or more sidelink channels 410 may use resource pools. For example, a scheduling assignment (e.g., included in SCI 430) may be transmitted in sub-channels using specific resource blocks (RBs) across time. In some examples, data transmissions (e.g., on the PSSCH 420) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 405 may operate in a resource allocation mode (e.g., Mode 1) in which a base station allocates resources for sidelink communications between UEs 405. In some examples, a UE 405 may operate using a resource allocation mode (e.g., Mode 2) in which resource selection and/or scheduling is autonomously performed by the UE 405 (e.g., rather than a base station 110). In some examples, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of RBs that the UE 405 can use for a particular set of subframes).

In the resource allocation mode where resource selection and/or scheduling is performed by a UE 405 (e.g., Mode 2), the UE 405 may generate sidelink grants, and may transmit the grants in SCI 430. A sidelink grant may indicate, for example, one or more parameters (e.g., transmission parameters) to be used for an upcoming sidelink transmission, such as one or more RBs to be used for the upcoming sidelink transmission on the PSSCH 420 (e.g., for TBs 435), one or more subframes to be used for the upcoming sidelink transmission, and/or an MCS to be used for the upcoming sidelink transmission. In some examples, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
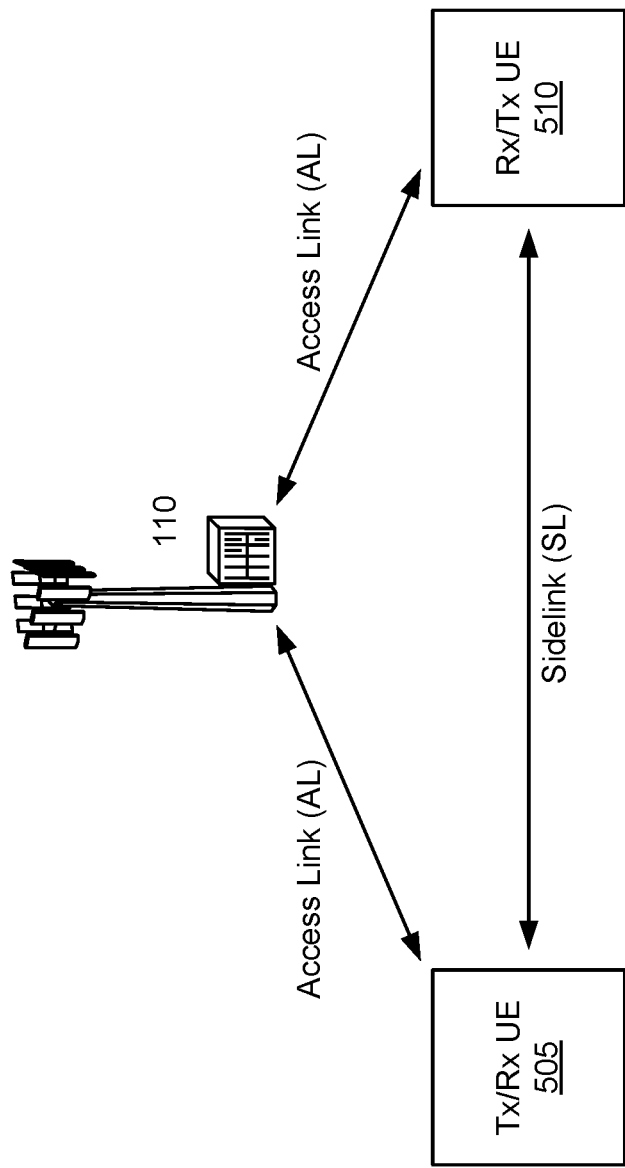
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
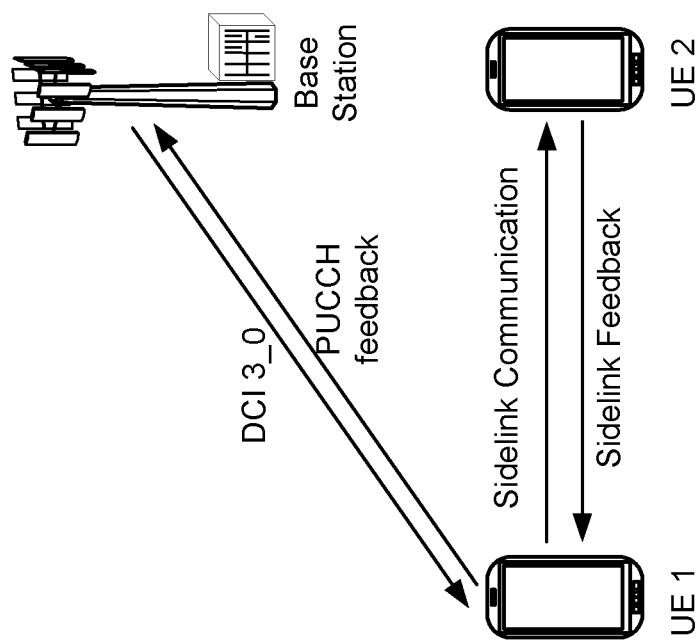
FIG. 6 is a diagram illustrating an example of Mode 1 sidelink resource allocation, in accordance with the present disclosure.

FIG. 6 is a diagram illustrating an example 600 of Mode 1 sidelink resource allocation, in accordance with the present disclosure. Mode 1 is a sidelink resource allocation mode in which a base station allocates resources for sidelink communications between UEs.

As shown in FIG. 6, example 600 includes a base station, a first UE (UE1), and a second UE (UE2). UE1 may be a Tx UE for a sidelink communication, and UE2 may be an Rx UE for the sidelink communication. As shown in FIG. 6, the base station may transmit, to UE1, downlink control information (DCI) that indicates a resource allocation for a sidelink communication to be transmitted by UE1. The base station may indicate the resource allocation for the sidelink communication via DCI format 3_0 (DCI 3_0). UE1 may transmit a sidelink communication (e.g., PSSCH/PSCCH communication) to UE2 using the resources (e.g., time and frequency resources) allocated for the sidelink communication in the DCI received from the base station. UE2 may transmit sidelink feedback (e.g., HARQ ACK/NACK feedback) to UE1 in connection with receiving the sidelink communication from UE1. UE1 may transmit PUCCH feedback to the base station in connection with receiving the sidelink feedback from UE2. For example, UE1 may transmit the sidelink feedback (e.g., HARQ ACK/NACK feedback) received from UE2 to the base station via a PUCCH communication using an allocated PUCCH resource indicate in the DCI.

The DCI 3_0 may indicate a resource allocation for sidelink transmission of one TB by UE1. The resource allocation indicated in the DCI 3_0 may include a time domain resource allocation (TDRA) and a frequency domain resource allocation (FDRA) for sidelink resources to be used by UE1 to transmit one TB. The DCI 3_0 may indicate a resource pool index that identifies a sidelink resource pool in which the sidelink transmission is scheduled, a time gap (e.g., sl-DCI-ToSL-Trans) between the DCI and the sidelink resource pool, and a resource allocation (e.g., TDRA and FDRA) for the sidelink transmission within the sidelink resource pool. In some examples, the DCI 3_0 may include a resource allocation (e.g., TDRA and FDRA) for one or more retransmissions of the same TB. In some examples, the DCI 3_0 may also include a HARQ process number (HPN), an NDI, a lowest subchannel index for the resource allocation, a PSFCH-to-HARQ feedback timing indicator (e.g., sl-PSFCCH-toPUCCH), a PUCCH resource indicator (PRI), a configuration index, and/or a sidelink assignment indicator (SAI).

For sidelink communications with Mode 1 sidelink resource allocation, the base station may indicate (e.g., in the DCI 3_0) a resource allocation for transmission of one sidelink TB by a Tx UE (e.g., UE1). The base station may also indicate a resource allocation for one or more retransmissions of the same sidelink TB. In Mode 1, the base station may control a maximum number of retransmissions of a sidelink TB. For example, the NDI indicated in the DCI 3_0 may force the Tx UE (e.g., UE1) to stop retransmissions of a sidelink TB. The base station may configure (e.g., via RRC signaling) an MCS range to be used by the Tx UE (e.g., UE1) for sidelink transmissions. However, in some examples, the DCI (e.g., DCI 3_0) that indicates the resource allocation for transmission of a sidelink TB may not indicate a destination (e.g., an Rx UE) for the sidelink TB. The Tx UE (e.g., UE1) may determine which TB (including a destination of Rx UE identifier) to transmit using the resource allocation provided by the base station in the DCI. That is, the Tx UE (e.g., UE1) may select the Rx UE (e.g., UE2) for the sidelink TB transmitted using the resource allocation indicated in the DCI. The Tx UE (e.g., UE1) may also select the MCS for the sidelink communication, within the MCS range configured by the base station, select whether sidelink HARQ is enabled or disabled for the sidelink communication, select a sidelink HPN for the sidelink communication, and/or select other transmissions parameters for the sidelink communication.

In some examples, the ability of the base station to perform interference management for interference between different sidelink communications (e.g., transmissions of different sidelink TBs) may be limited without the base station having knowledge of the destinations (e.g., Rx UEs) of sidelink communications. This may reduce the ability of the base station allocate the same (or overlapping) sidelink resources for different sidelink communications without risking interference between the sidelink communications. For example, the base station may not be able to schedule different sidelink communications that re-use the same sidelink resources on different spatial layers (e.g., in FR1) and/or in different beam directions (e.g., in FR2) without knowledge of the destinations (e.g., Rx UEs) for the sidelink communications. As a result, the base station may be prevented from re-using sidelink resources, and thus increasing throughput and decreasing latency for sidelink communications.

Some techniques and apparatuses described herein enable, a network node (e.g., base station 110, CU 310, DU 330, RU 340, or a combination thereof) to transmit scheduling information that indicates resource allocations for multiple sidelink TBs. The scheduling information may indicate one or more receiving UEs associated with the multiple sidelink TBs. A UE (e.g., a Tx UE) may receive the scheduling information, and the UE may transmit one or more sidelink TBs of the multiple sidelink TBs based at least in part on the resource allocations and the one or more receiving UEs indicated in the scheduling information. As a result, the network node may control the Rx UEs associated with transmissions of the sidelink TBs scheduled by the scheduling information, which may enable the network node to manage interference between the transmissions of the sidelink TBs when allocating the resources for the transmissions of the sidelink TBs. Such interference management may enable the network node to schedule transmissions of different sidelink TBs (e.g., from different Tx UEs) that re-use the same (or overlapping) sidelink resources. Thus, the network node may increase spatial re-use of sidelink resources (e.g., in FR1) and/or re-use of sidelink resources in different beams directions (e.g., in FR2), which may increase throughput and decrease latency for sidelink communications.

As indicated above, FIG. 6 is provided as an example. Other examples may differ from what is described with respect to FIG. 6.

Figure 7:
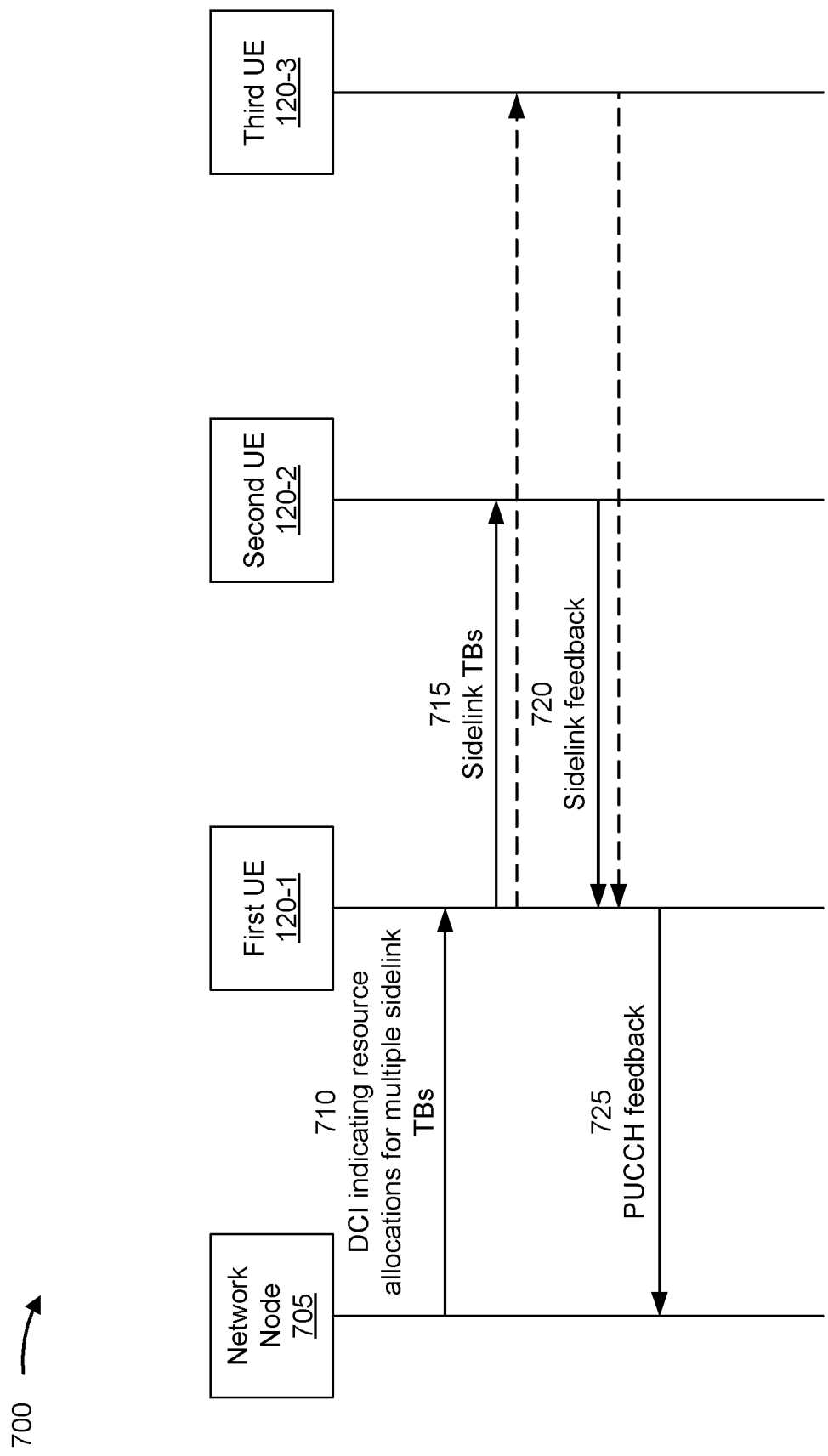

FIG. 7 is a diagram illustrating an example 700 associated with multi-TB sidelink scheduling, in accordance with the present disclosure. As shown in FIG. 7, example 700 includes a network node 705 (e.g., base station 110, CU 310, DU 330, RU 340, or a combination thereof), a first UE 120-1, a second UE 120-2, and a third UE 120-3. In some aspects, the network node 705 and the UEs 120 may be included in a wireless network, such as wireless network 100. The network node may communication with the UEs 120 via wireless access links, which may include uplinks and downlinks. The UEs 120 may communicate with each other via sidelink communications.

In some aspects, sidelink resources for the sidelink communications between the UEs 120 may be allocated using Mode 1 sidelink resource allocation, in which the network node 705 indicates sidelink resource allocations for the sidelink communications between the UEs 120. In some aspects, the first UE 120-1 may be a Tx UE for one or more sidelink communications scheduled by the network node 705, and the second UE 120-2 and/or the third UE 120-3 may be Rx UEs for the one or more sidelink communications scheduled by the network node 705.

As shown in FIG. 7, and by reference number 710, the network node 705 may transmit, to the first UE 120-1, scheduling information that indicates resource allocations for transmissions of multiple sidelink TBs. The first UE 120-1 may receive the scheduling information transmitted by the network node 705. In some aspects, the scheduling information may be DCI that includes resource allocations for transmissions of multiple sidelink TBs. In some aspects, the scheduling information may be configuration information transmitted to the first UE 120-1 (and/or other UEs) via RRC signaling (e.g., in an RRC message) from the network node 705. An example in which the scheduling information is DCI is described herein in connection with FIG. 7. In other examples, in which the scheduling information transmitted via RRC signaling (e.g., for configured grant (CG) type 1), the scheduling information may include the same or similar information as the DCI described in connection with FIG. 7.

The network node 705 may transmit the DCI via a PDCCH communication. In some aspects, the network node 705 may transmit the DCI to one or more Tx UEs, including the first UE 120-1. The DCI may indicate one or more Rx UEs (e.g., the second UE 120-2, the third UE 120-3, and/or one or more other Rx UEs) associated with the multiple side TBs for which resources are allocated in the DCI. In some aspects, the network node 705 may transmit the DCI to one or more of the Rx UEs (e.g., the second UE 120-2, the third UE 120-3, and/or one or more other Rx UEs). In some aspects, the first UE 120-1 may forward the DCI to one or more of the Rx UEs (e.g., the second UE 120-2, the third UE 120-3, and/or one or more other Rx UEs).

The DCI may indicate resource allocations for transmissions of multiple sidelink TBs. The network node 705 may specify, in the DCI, an Rx UE for each sidelink TB resource allocation indicated in the DCI. In some aspects, the network node 705 may also control (e.g., via one or more indications in the DCI) one or more of an MCS, a redundancy value (RV), a DMRS pattern/port, whether sidelink HARQ is enabled or disabled, and/or a cast type for each of the sidelink TB transmissions for which resources are allocated in the DCI. In some aspects, the DCI may indicate an HPN for a sidelink TB resource allocation, and a Tx UE (e.g., the first UE 120-1) may be required to populate the HPN indicated in the DCI in SCI associated with a sidelink transmission using the sidelink TB resource allocation.

In some aspects, the resource allocations indicated in the DCI may be resource allocations for transmissions of multiple sidelink TBs from a Tx UE (e.g., the first UE 120-1) to one Rx UE (e.g., the second UE 120-2) indicated in the DCI. For example, the DCI may indicate that the Rx UE is the second UE 120-2, and the DCI may include resource allocations to be used by the first UE 120-1 to transmit multiple different sidelink TBs to the second UE 120-2.

In some aspects, the resource allocations indicated in the DCI may include resource allocations to multiple different Rx UEs (e.g., the second UE 120-2, the third UE 120-3, and/or one or more other Rx UEs). In some aspects, the resource allocations may include resource allocations for transmissions of the sidelink TBs from one Tx UE (e.g., the first UE 120-1) to multiple different Rx UEs (e.g., the second UE 120-2, the third UE 120-3, and/or one or more other Rx UEs). In some aspects, the resource allocations may include resource allocations for transmissions of the sidelink TBs from multiple Tx UEs (e.g., the first UE 120-1 and one or more other Tx UE) to multiple Rx UEs (e.g., the second UE 120-2, the third UE 120-3, and/or one or more other Rx UEs).

In some aspects, the DCI may indicate a respective Rx UE for each sidelink TB of the multiple sidelink TBs (e.g., for each sidelink TB resource allocation indicated in the DCI). In some aspects, the DCI may include, for each sidelink TB for which resources are allocated in the DCI, an indication of a respective UE identifier (ID) that corresponds to the respective Rx UE for that sidelink TB. For example, the DCI may include resource allocations for N sidelink TBs, and the DCI may include N Rx UE IDs (RxID1, RxID2, ... RxIDN) that identify the respective Rx UEs for the N sidelink TBs. In this case, a DCI transmission (e.g., DCI in a PDCCH communication) may support up to a certain quantity of sidelink TB resource allocations. In some aspects, the resource allocation for each sidelink TB may be included in the DCI in a reading position associated with the respective receiving UE for that sidelink TB. For example, a Tx UE (e.g., the first UE 120-1) may be configured (e.g., via RRC configuration) with a mapping between a set of resource allocation reading positions in the DCI and a set of receiving UEs. Each resource allocation reading position in the DCI may be configured to map to a corresponding Rx UE. In this case, for each resource allocation for a sidelink TB indicated in the DCI, the Tx UE (e.g., the first UE 120-1) may determine the respective Rx UE for that resource allocation based at least in part on the reading position at which that resource allocation is indicated in the DCI.

In some aspects, the DCI may be scrambled using a cyclic redundancy check (CRC) scrambling sequence associated with a group of UEs, and the DCI may identify the respective receiving UE for each sidelink TB from the group of UEs associated with the CRC scrambling sequence used to scramble the DCI. For example, a set of UEs may be divided into multiple groups of UEs. Each group of UEs may be associated with a respective CRC scrambling sequence. For example, a CRC scrambling sequence may indicate a partial UE ID that identifies the group of UEs associated with that CRC scrambling sequence. In this case, the CRC scrambling sequence used to scramble the DCI may identify the group of UEs, and the DCI may indicate (e.g., using UE IDs and/or configured reading positions) which UEs, from the group of UEs, are the respective Rx UEs for the sidelink TBs.

In some aspects, the control channel element (CCE) index associated with the DCI may correspond to a group of UEs, and the DCI may identify the respective receiving UE for each sidelink TB from the group of UEs corresponding to the CCE index associated with the DCI. For example, a set of UEs may be divided into multiple groups of UEs. Each group of UEs may be associated with a respective CCE index. For example, a CCE index may indicate a partial UE ID that identifies the group of UEs corresponding to that CCE index. In this case, the CCE index used to decode the DCI may identify the group of UEs, and the DCI may indicate (e.g., using UE IDs and/or configured reading positions) which UEs, from the group of UEs, are the respective Rx UEs for the sidelink TBs.

In some aspects, in a case in which the resource allocations indicated in the DCI include resource allocations for transmissions of multiple sidelink TBs from a same Tx UE (e.g., the first UE 120-1) to different Rx UEs (e.g., the second UE 120-2, the third UE 120-3, and/or one or more other Rx UEs), the DCI may indicate a Tx UE ID that is associated with multiple Rx UE IDs. The Tx UE ID may identify the Tx UE (e.g., the first UE 120-1). For example, the DCI may include an indication of a TX UE ID that indicates that the first UE 120-1 is the Tx UE for the multiple sidelink TBs, and the DCI may include, for each TB of the multiple sidelink TBs, an indication of a respective Rx UE ID that identifies the respective Rx UE for that sidelink TB. For example, the DCI may indicate that the first UE 120-1 is the Tx UE for a first sidelink TB and a second sidelink TB, that the second UE 120-2 is the Rx UE for the first sidelink TB, and that the third UE 120-3 is the Rx UE for the second sidelink TB.

In some aspects, in a case in which the resource allocations indicated in the DCI include resource allocations for transmissions of sidelink TBs associated with multiple different Tx UEs (e.g., the first UE 120-1 and one or more other Tx UEs) and multiple different Rx UEs (e.g., the second UE 120-2, the third UE 120-3, and/or one or more other Rx UEs), the DCI may indicate a respective Tx UE and a respective Rx UE (e.g., a respective Tx UE and Rx UE pair) for each sidelink TB of the multiple sidelink TBs for which resource allocations are indicated in the DCI. For example, the DCI may indicate the respective Tx UEs for the sidelink TBs similarly to the DCI indication respective Rx UEs for the sidelink TBs, as described above. In some aspects, the DCI may include, for each sidelink TB for which a resource allocation is indicated in the DCI, an indication of a respective Rx UE ID that identifies the respective Rx UE for that TB and an indication of a respective Tx UE ID that identifies the respective Tx UEs for that TB.

In some aspects, the resource allocations indicated in the DCI may be dynamic grant (DG) resource allocations for transmissions of multiple sidelink TBs. In some aspects, the DCI may include, for each sidelink TB of the multiple sidelink TBs, a respective dedicated bit field for indicating the resource allocation (e.g., DG resource allocation) for transmitting that sidelink TB. In this case, the DCI may separately indicate the resource allocations for the sidelink TBs in the respective dedicated bit fields for the sidelink TBs. For example, the DCI may include, for each sidelink TB of the multiple sidelink TBs, respective indications of a resource pool, an MCS, a time gap, a TDRA, an FDRA, and an NDI. In some aspects, the DCI may also include a separate indication of an HPN for each sidelink TB resource allocation. In this case, the DCI included in a PDCCH communication may support a certain number of sidelink TBs (e.g., X sidelink TBs). For example, in a case in which the resource allocations are for transmissions of sidelink TBs from one Tx UE (e.g., the first UE 120-1) (or multiple Tx UEs) to multiple different Rx UEs, the DCI may support up to X users, where each user corresponds to a respective Rx UE (or a respective Tx UE and Rx UE pair).

In some aspects, the DCI may indicate a common resource pool and time gap for all of the multiple sidelink TBs for which the resource allocations (e.g., DG resource allocations) are indicated in the DCI. In this case, the DCI may include separate indications of MCS, TDRA, and FDRA for each sidelink TB of the multiple sidelink TBs. The common resource pool may be a sidelink resource pool in which the transmissions of all of the sidelink TBs are scheduled. The time gap may be a time duration between receiving the DCI and a beginning of the common resource pool. For each sidelink TB, the TDRA and the FDRA indicate the allocated sidelink resources in the common resource pool for one or multiple transmissions of that sidelink TB. In some aspects TDRA for each sidelink TB may include an offset value between a beginning of the common resource pool and a first transmission of that sidelink TB, and one or more offset values between different transmissions (e.g., repetitions) of that sidelink TB. In this way, the TDRAs of different sidelink TBs may be scheduled with different time gaps based at least in part on the common time gap indicated for all of the sidelink TBs. In some aspects, value ranges may be different for the offset value between the beginning of the common resource pool and the first transmission of a sidelink TB and for the offset values between different transmissions (e.g., repetitions) of the same TB. Resource allocations with a shared common resource pool and time gap are depicted in greater detail in FIG. 9.

In some aspects, the DCI may indicate a common TDRA and a common FDRA for all of the multiple sidelink TBs (e.g., for DG resource allocations for the multiple sidelink TBs). The common TDRA and the common FDRA may be shared for all of the sidelink TBs (e.g., for all users, in the case of multiple Rx UEs). In this case, the DCI may include additional fields that indicate a TB-specific TDRA and FDRA, within the common TDRA and the common FDRA, for each sidelink TB. In some aspects, the DCI may indicate at least one of a time domain multiplexing (TDM) pattern, a frequency domain multiplexing (FDM) pattern, or a spatial domain multiplexing (SDM) pattern for transmitting the sidelink TBs using the common TDRA and common FDRA. The DCI may indicate the TDM pattern using respective TDM bit fields for each sidelink TB. For example, for each sidelink TB, the respective TDM bit fields may include bit fields for each time resource in the common TDRA that indicate which of the time resources in the common TDRA are to be used to transmit that sidelink TB. The DCI may indicate the FDM pattern using respective FDM bit fields for each sidelink TB. For example, for each sidelink TB, the respective FDM bit fields may include bit fields that indicate a subchannel group or a starting subchannel bandwidth for transmitting that sidelink TB. In some aspects, the DCI may indicate the SDM pattern by indicating different spatial layers to be used for transmitting different sidelink TBs. For example, the DCI may indicate the spatial layer for a sidelink TB using an indication of a DMRS port. In some aspects, the selection of the DMRS port for a sidelink TB may be performed by the Tx UE (e.g., the first UE 120-1). In some aspects, in a case in which the common TDRA and the common FDRA are indicated in the DCI, the DCI may include separate indications of MCS and NDI for each sidelink TB. Resource allocations with a shared common TDRA and FDRA are depicted in greater detail in FIG. 10.

In some aspects, the DCI may include an indication of a common HPN for all of the resource allocations for the multiple sidelink TBs. In some aspects, the Tx UE(s) (e.g., the first UE 120-1) may indicate transmission of the sidelink TBs to different Rx UEs (and/or from different Tx UEs) in SCI-2 included in the sidelink TB transmission. In some aspects, the common HPN may be a nominal HPN indicated in the DCI, and the HPN for each sidelink TB (e.g., the HPN indicated in the SCI transmitted with each sidelink TB) may be determined based at least in part on the common HPN. For example, for each sidelink TB transmitted by a Tx UE (e.g., the first UE 120-1), the Tx UE (e.g., the first UE 120-1) may determine the HPN for that sidelink TB from the common HPN based at least in part on the Rx UE ID associated with the Rx UE and/or the Tx UE ID associated with the Tx UE.

In some aspects, the resource allocations indicated in the DCI may be multiple configured grant (CG) resource allocations. The CG resource allocations may allocate reoccurring sidelink resources for periodic transmissions of sidelink TBs by the first UE 120-1 (and/or one or more other Tx UEs). For example, each CG resource allocation may correspond to an allocation of sidelink resources for periodic sidelink communications associated with a different use (e.g., a different Rx UE or a different a Tx UE and Rx UE pair). In some aspects, the DCI may indicate a respective CG configuration index, a respective TDRA, and a respective FDRA for each CG resource allocation. In this case, the respective FDRA may indicate activation or deactivation for each CG resource allocation (e.g., for each Rx UE or for each Tx UE and Rx UE pair). In some aspects, the DCI may indicate a respective CG configuration index for each CG resource allocation, and the DCI may indicate a common TDRA and FDRA for all of the multiple CG resource allocations. In this case, the DCI may indicate at least one of a TDM pattern, an FDM pattern, or an SDM pattern for each CG resource allocation, and the TDM pattern, the FDM pattern, and/or the SDM pattern may indicate activation or deactivation for each CG resource allocation within the common TDRA and FDRA.

In some aspects, the DCI may indicate a common CG configuration index for all of the multiple CG resource allocations. In some aspects, in a case in which the DCI indicates the common CG configuration index for all of the CG resource allocations, the DCI may indicate a respective TDRA and a respective FDRA for each CG resource allocation. In some aspects, in a case in which the DCI indicates the common CG configuration index for all of the CG resource allocations, the DCI may indicate a common TDRA and FDRA for all of the CG resource allocations, and the DCI may indicate at least one of a TDM pattern, an FDM pattern, or an SDM pattern for each CG resource allocation.

In some aspects, in the case in which the DCI indicates multiple CG resource allocations, the HPN field in the DCI may be used (e.g., repurposed) for indicating activation or deactivation validation for each of the CG resource allocations. For example, each bit in the HPN bit field may be used to provide an indication of activation or deactivation for a corresponding CG resource allocation indicated in the DCI. In some aspects, in the case in which the DCI indicates multiple CG resource allocations, the HPN field in the DCI may be used (e.g., repurposed) for indicating the CG configuration index for each CG resource allocation indicated in the DCI.

In some aspects (e.g., for DG and/or CG resource allocations), the DCI may include at least one indication of a PUCCH resource and a timing for PUCCH feedback to be transmitted to the network node 705. In some aspects, the DCI may include at least one indication of a PUCCH resource and a timing for PUCCH feedback to be transmitted from a Tx UE (e.g., the first UE 120-1) to the network node 705. In some aspects, the DCI may include a PRI and a PUCCH feedback timing indication that identify multiple PUCCH resources and timings for PUCCH feedback associated with transmissions of the multiple sidelink TBs. For example, the first UE 120-1 may be configured (e.g., via RRC configuration from the network node 705) with a mapping between indicated values of PRI and PUCCH feedback timing in the DCI and sets of multiple PUCCH resources and timings for transmitting PUCCH feedback to the network node 705. In some aspects, the DCI may include respective indications of the PUCCH resource (e.g., PRI) and the timing for the PUCCH feedback for each sidelink TB (or each CG resource allocation) for which the resource allocation is included in the DCI. For example, the DCI may include separated fields for indicating the PRI and the PUCCH feedback timing for each TB or the multiple TBs for which resources are allocated in the DCI.

In some aspects, the DCI may include an indication of a PUCCH resource (e.g., PRI) and a timing for a transmission, from a Tx UE (e.g., the first UE 120-1), of aggregated PUCCH feedback for all of the sidelink TBs transmitted by the Tx UE (e.g., the sidelink TBs transmitted to all Rx UEs by the Tx UE). In some aspects, the indicated PUCCH resource may be allocated for the Tx UE (e.g., the first UE 120-1) to transmit separate ACK/NACK feedback for each sidelink TB transmitted by the Tx UE (e.g., for each Rx UE). In some aspects, the indicated PUCCH resource may be allocated for a single ACK/NACK feedback indication for all of the sidelink TBs transmitted by the Tx UE (e.g., for all of the Rx UEs). In some aspects, the indicated PUCCH feedback timing may be defined with respect to a last PSFCH resource associated with the multiple sidelink TBs (determined based at least in part on the TDRA for the multiple sidelink TBs). In some aspects, in a case in which the DCI includes resource allocations associated with multiple Tx UEs (e.g., the first UE 120-1 and one or more other Tx UEs), the DCI may include a separate indication of the PUCCH resource (e.g., PRI) and the PUCCH feedback timing for the aggregated PUCCH feedback, for each Tx UE.

In some aspects, the DCI may indicate, for one or more receiving UEs indicated in the DCI, a PUCCH resource and a timing for the receiving UE to transmit sidelink feedback associated with receiving one or more of the sidelink TBs to the network node 705 via a PUCCH communication. In this case, the network node 705 may transmit the DCI to the one or more Rx UEs, and the DCI may schedule transmission of sidelink feedback associated with the sidelink TBs from the one or more Rx UEs to the network node 705 via one or more PUCCH communications.

The SAI field in the DCI may provide an indication for a UE (e.g., the first UE 120-1) to increment an SAI associated with the UE. In some aspects, the DCI may provide an indication, in the SAI field, to increment the SAI associated with a Tx UE (e.g., the first UE 120-1) by a number of sidelink TBs allocated in the DCI to be transmitted by the Tx UE. In this case, the Tx UE (e.g., the first UE 120-1) may derive the number of sidelink TBs for which resource allocations are indicated in the DCI from the SAI field in the DCI. For example, when receiving the DCI from the network node 705, the first UE 120-1 may determine the number of sidelink TBs allocated from the SAI field, and then search for bit fields indicating the resource allocations based at least in part on the determination of the number of sidelink TBs allocated.

In some aspects, the SAI associated with the first UE 120-1 may be incremented in connection with the number of DCI transmissions, even though the DCI may include resource allocations for multiple sidelink TBs. For example, the DCI may include an indication, in the SAI field, to increment the SAI by one, and the SAI associated with the first UE 120-1 may be incremented by one in connection with receiving the DCI. In this case, the number of sidelink TBs allocated in the DCI may be preconfigured (e.g., via RRC configuration), and the first UE 120-1 may determine that the HARQ payload size increases by a number of ACK/NACK bits corresponding to the configured number of sidelink TBs allocated in the DCI in connection with incrementing the SAI associated with the first UE 120-1 by one.

In some aspects, the DCI includes an indication, in the SAI field, to increment a sidelink assignment indicator associated with the first UE 120-1 by a number of feedback bits to be transmitted to the network node 705. For example, SAI associated with the first UE 120-1 may be increased by the number of ACK/NACK bits expected in the sidelink HARQ feedback from the one or more Rx UEs. In this case, the number of sidelink TB resource allocations in the DCI may be preconfigured (e.g., via RRC configuration), and the network node 705 may provide an indication of a HARQ operation to be performed by the first UE 120-1 by indicating a number of feedback bits in the SAI field of the DCI that is different from the number of sidelink TBs for which resource allocations are indicated in the DCI. In some aspects, in a case in which the number of sidelink TBs for resource allocations are indicated in the DCI is greater than the number of feedback bits indicated in the SAI field, the first UE 120-1 may apply HARQ bundling to the HARQ feedback associated with one or more of the sidelink TBs transmitted by the first UE 120-1. In this case, the first UE 120-1 may transmit the HARQ feedback associated with multiple sidelink TBs to the network node 705 using HARQ bundling (e.g., by using a single ACK/NACK bit to indicate the HARQ feedback for multiple sidelink TBs). In some aspects, in a case in which the number of sidelink TBs for resource allocations are indicated in the DCI is less than the number of feedback bits indicated in the SAI field, the first UE 120-1 may apply multi-bit HARQ feedback for one or more sidelink TBs transmitted by the first UE 120-1. In this case, the first UE 120-1 may transmit multi-bit HARQ feedback for one or more sidelink TBs to the network node 705.

As further shown in FIG. 7, and by reference number 715, the first UE 120-1 may transmit one or more sidelink TBs to one or more Rx UEs (e.g., the second UE 120-2, the third UE 120-3, and/or one or more other Rx UEs) based at least in part on the resource allocations and the one or more Rx UEs indicated in the DCI.

In some aspects, the first UE 120-1 may transmit multiple sidelink TBs to the second UE 120-2 based at least in part on the resource allocations indicated in the DCI. For example, the DCI may include resource allocations for transmissions of multiple sidelink TBs from the first UE 120-1 to the second UE 120-2. In some aspects, the first UE 120-1 may transmit one or more sidelink TBs to the second UE 120-2 and one or more sidelink TBs to the third UE 120-3 based at least in part on the resource allocations indicated in the DCI. For example, the DCI may include resource allocations for transmissions of sidelink TBs from the first UE 120-1 to multiple different Rx UEs, including the second UE 120-2, the third UE 120-3, and/or one or more other Rx UEs.

As further shown in FIG. 7, and by reference number 720, the first UE 120-1 may receive, from the one or more Rx UEs (e.g., the second UE 120-2, the third UE 120-3, and/or one or more other Rx UEs), sidelink feedback.

In some aspects, the second UE 120-2 may receive one or more sidelink TBs transmitted by the first UE 120-1. For each sidelink TB received from the first UE 120-1, the second UE 120-2 may transmit, to the first UE 120-1, sidelink feedback in a PSFCH resource. For example, the sidelink feedback for a sidelink TB received from the first UE 120-1 may be HARQ feedback including an ACK/NACK bit that indicates whether or not the second UE 120-2 has successfully decoded the sidelink TB.

In some aspects, the third UE 120-3 may receive one or more sidelink TBs transmitted by the first UE 120-1. For each sidelink TB received from the first UE 120-1, the third UE 120-3 may transmit, to the first UE 120-1, sidelink feedback in a PSFCH resource. For example, the sidelink feedback for a sidelink TB received from the first UE 120-1 may be HARQ feedback including an ACK/NACK bit that indicates whether or not the third UE 120-3 has successfully decoded the sidelink TB.

As further shown in FIG. 7, and by reference number 725, the first UE 120-1 may transmit, to the network node 705, PUCCH feedback associated with the sidelink TBs transmitted by the first UE 120-1 based at least in part on the at least one indication, in the DCI, of the PUCCH resource and the timing for the PUCCH feedback. The network node 705 may receive the PUCCH feedback transmitted by the first UE 120-1. In some aspects, the network node 705 may receive the PUCCH feedback transmitted by the first UE 120-1 and other PUCCH feedback transmitted by one or more other Tx UEs for which resources were allocated in the DCI for transmissions of sidelink TBs.

In some aspects, the PUCCH feedback transmitted from the first UE 120-1 to the network node 705 may include transmissions via multiple different PUCCH resources. For example, in a case in which the DCI indicates respective PUCCH resources (e.g., PRIs) and PUCCH feedback timings for the multiple sidelink TBs (e.g., via separate fields in the DCI for each sidelink TB or via a mapping from indicated PRI and PUCCH feedback timing values in the DCI to a set of PUCCH resources and timings), the first UE 120-1 may transmit, to the network node 705, the PUCCH feedback associated with each sidelink TB transmitted by the first UE 120-1 in the respective PUCCH resource (and with the respective PUCCH feedback timing) indicated for that sidelink TB. For example, the PUCCH feedback associated with a sidelink TB may include an indication of the sidelink feedback (e.g., the ACK/NACK bit) received, by the first UE 120-1, from the Rx UE (e.g., the second UE 120-2 or the third UE 120-3) that received the sidelink TB.

In some aspects, the first UE 120-1 may aggregate the sidelink feedback (e.g., the ACK/NACK bits) associated with multiple sidelink TBs transmitted by the first UE 120-1 (e.g., sidelink feedback received from one or more Rx UEs), and the first UE 120-1 may transmit aggregated PUCCH feedback to the network node 705. The aggregated PUCCH feedback may be the aggregated sidelink feedback that is transmitted to the network node 705 in a PUCCH resource. For example, the first UE 120-1 may transmit the aggregated sidelink feedback to the network node 705 in a PUCCH resource indicated in the DCI and in accordance with a PUCCH timing indicated in the DCI. In some aspects, the aggregated PUCCH feedback may include a separate ACK/NACK bit for each sidelink TB transmitted by the first UE 120-1. In some aspects, the aggregated PUCCH feedback may include an ACK/NACK bit that represents all of the ACK/NACK feedback received from the one or more Rx UEs for the sidelink TBs transmitted by the first UE 120-1.

In some aspects, based at least in part on indications of PUCCH resources and timings for the Rx UEs (e.g., the second UE 120-2 and/or the third UE 120-3) in the DCI, the Rx UEs (e.g., the second UE 120-2 and/or the third UE 120-3) may transmit the sidelink feedback associated with the sidelink TBs received from the first UE 120-1 to the network node 705 via one or more PUCCH resources indicated in the DCI.

As described above, the network node 705 may transmit DCI that indicates resource allocations for multiple sidelink TBs and indicates one or more Rx UEs associated with the sidelink TBs. In some aspects, the network node 705 may determine the resource allocations of the multiple sidelink TBs to manage interference between sidelink communications to different Rx UEs. In some aspects, the network node 705 may determine the resource allocations of the multiple sidelink TBs to increase spatial re-use of sidelink resources without causing significant interference between the sidelink communications that use the same sidelink resources. In some aspects, the network node 705 may determine the resource allocations of the multiple sidelink TBs to re-use sidelink resources based at least in part on a determination that the beam directions for sidelink communications that use the same sidelink resources do not interference with each other. In some aspects, the network node 705 may determine the resource allocations for the multiple sidelink communications to schedule multi-user MIMO (MU-MIMO) transmissions of sidelink communications for UEs with different capabilities (e.g., UEs with different numbers of antennas).

As indicated above, FIG. 7 is provided as an example. Other examples may differ from what is described with respect to FIG. 7.

Figure 8:
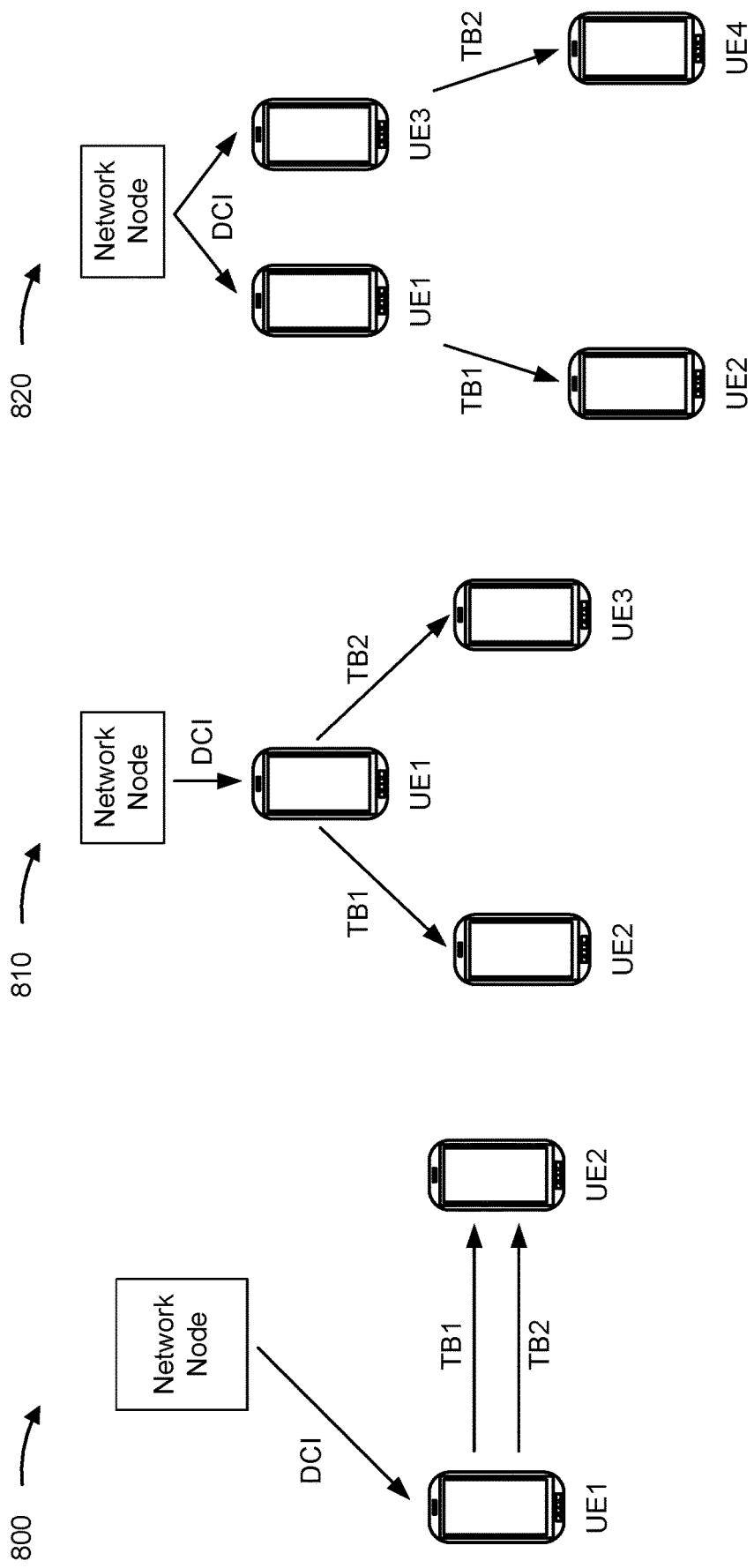

FIG. 8 is a diagram illustrating examples 800, 810, and 820 associated with multi-TB sidelink scheduling, in accordance with the present disclosure. As shown in FIG. 8, example 800 includes a network node (e.g., network node 705, base station 110, CU 310, DU 330, RU 340, or a combination thereof), a first UE (UE1), and a second UE (UE2). The network node may transmit, to UE1, DCI that indicates resource allocations for multiple sidelink TBs and indicates one or more Rx UEs associated with the multiple sidelink TBs. As shown in example 800, the DCI may indicate resource allocations for transmissions of multiple sidelink TBs from a TX UE (e.g., UE1) to the same Rx UE (e.g., UE2). For example, the DCI may indicate resource allocations for transmissions of a first sidelink TB (TB1) and a second sidelink TB (TB2) from UE1 to UE2. In this case, UE1 may transmit TB1 and TB2 to UE2 in accordance with the resource allocations for TB1 and TB2 indicated in the DCI.

As further shown in FIG. 8, example 810 includes a network node (e.g., network node 705, base station 110, CU 310, DU 330, RU 340, or a combination thereof), a first UE (UE1), a second UE (UE2), and a third UE (e.g., UE3). The network node may transmit, to UE1, DCI that indicates resource allocations for multiple sidelink TBs and indicates one or more Rx UEs associated with the multiple sidelink TBs. As shown in example 810, the DCI may indicate resource allocations for transmissions of sidelink TBs from a TX UE (e.g., UE1) to multiple different Rx UEs (e.g., UE2 and UE3). For example, the DCI may indicate a resource allocation for a transmission of a first sidelink TB (TB1) from UE1 to UE2 and a resource allocation for a transmission of a second sidelink TB (TB2) from UE1 to UE3. In this case, UE1 may transmit TB1 to UE2 and transmit TB2 to UE3 in accordance with the resource allocations for TB1 and TB2 indicated in the DCI.

In some aspects, the DCI may indicate resource allocations for sidelink TBs for a Tx UE to a number of different Rx UEs (e.g., Rx UE1, Rx UE2, . . . , Rx UEN). For example, the Tx UE may be or may be a component of a programmable logic controller (PLC), and the Rx UEs (e.g., Rx UE1, Rx UE2, . . . Rx UEN) may be or may be components of N sensors or actuators that communicate with the PLC (e.g., the Tx UE) via sidelink communications.

As further shown in FIG. 8, example 820 includes a network node (e.g., network node 705, base station 110, CU 310, DU 330, RU 340, or a combination thereof), a first UE (UE1), a second UE (UE2), a third UE (e.g., UE3), and a fourth UE (e.g., UE4). The network node may transmit, to UE1 and UE3, DCI that indicates resource allocations for multiple sidelink TBs and indicates one or more Rx UEs associated with the multiple sidelink TBs. As shown in example 820, the DCI may indicate resource allocations for transmissions of multiple sidelink TBs with different a TX UEs (e.g., UE1 and UE3) and different Rx UEs (e.g., UE2 and UE4). For example, the DCI may indicate a resource allocation for a transmission of a first sidelink TB (TB1) from UE1 to UE2 and a resource allocation for a transmission of a second sidelink TB (TB2) from UE3 to UE4. In this case, UE1 may transmit TB1 to UE2 in accordance with the resource allocation for TB1 indicated in the DCI, and the UE3 may transmit TB2 to UE4 in accordance with the resource allocation for TB2 indicated in the DCI.

In the example 800, 810, and 820 of FIG. 8, scheduling information that indicates resource allocations for transmissions of multiple sidelink TBs is included in DCI. In other examples, the scheduling information that indicates resource allocations for transmission of multiple sidelink TBs may be transmitted via RRC signaling.

As indicated above, FIG. 8 is provided as an example. Other examples may differ from what is described with respect to FIG. 8.

Figure 9:
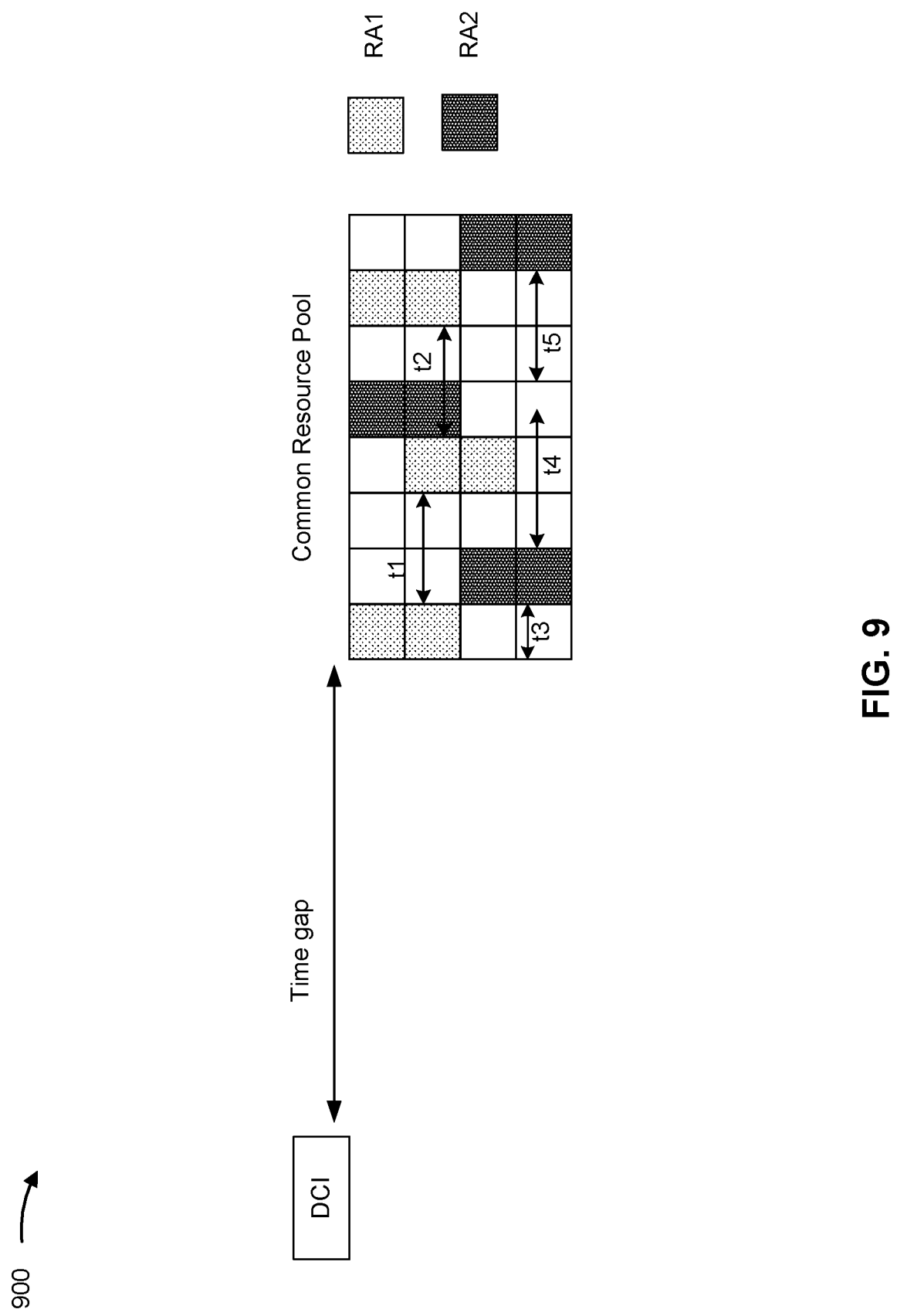

FIG. 9 is a diagram illustrating an example 900 associated with multi-TB sidelink scheduling, in accordance with the present disclosure. As shown in FIG. 9, example 900 shows an example of resource allocations for transmissions of multiple sidelink TBs indicated in DCI using a common resource pool and time gap.

As shown in FIG. 9, in some aspects, the DCI may indicate a common resource pool and time gap that are shared for all of resource allocations indicated in the DCI for multiple sidelink TBs. In this case, the DCI may include separate indications of MCS, TDRA, and FDRA for each sidelink TB of the multiple sidelink TBs. The common resource pool may be a sidelink resource pool in which the transmissions of all of the sidelink TBs are scheduled. The time gap may be a time duration between receiving the DCI and a beginning of the common resource pool. For each sidelink TB, the TDRA and the FDRA indicate the allocated sidelink resources in the common resource pool for one or multiple transmissions of that sidelink TB. For example, as shown in FIG. 9, a first resource allocation (RA1) for a first sidelink TB may include a first TDRA and a first FDRA in the common resource pool for multiple transmissions (e.g., repetitions) of the first sidelink TB. A second resource allocation (RA2) for a second sidelink TB may include a second TDRA and a second FDRA in the common resource pool for multiple transmissions (e.g., repetitions) of the second sidelink TB.

In some aspects TDRA for each sidelink TB may include an offset value between a beginning of the common resource pool and a first transmission of that sidelink TB, and one or more offset values between different transmissions (e.g., repetitions) of that sidelink TB. For example, as shown in FIG. 9, the first TDRA (e.g., the TDRA of RA1) may be represented by values of t1 and t2 in the DCI, where t1 is an offset between resources allocated for first and second transmissions of the first sidelink TB and t2 is an offset between resources allocated for second and third transmissions of the first sidelink TB. The first TDRA may not have any offset from the beginning of the common resource pool (e.g., the time gap for the first TDRA is the same as the common time gap indicated in the DCI). The second TDRA (e.g., the TDRA of RA2) may be represented by values of t3, t4, and t5 in the DCI, where t3 is an offset between the beginning of the common resource pool and resources allocated for a first transmission of the second sidelink TB, t4 is an offset between resources allocated for first and second transmissions of the second sidelink TB, and t5 is an offset between resources allocated for second and third transmissions of the second sidelink TB. In some aspects, a first range of values for offsets between different transmissions (e.g., repetitions) of the same TB (e.g., t1, t2, t4, and t5) may be different from a second range of values for offsets between the beginning of the common resource pool and the first transmission of a sidelink TB (e.g., t3). In one example, the first range of values may be from 0 to 31 symbols, and the second range of values may be from 0 to 4 symbols.

In the example of FIG. 9, scheduling information that indicates resource allocations for transmissions of multiple sidelink TBs is included in DCI. In other examples, the scheduling information that indicates resource allocations for transmission of multiple sidelink TBs may be transmitted via RRC signaling.

As indicated above, FIG. 9 is provided as an example. Other examples may differ from what is described with respect to FIG. 9.

FIG. 10 is a diagram illustrating an example 1000 associated with multi-TB sidelink scheduling, in accordance with the present disclosure. As shown in FIG. 10, example 1000 shows an example of resource allocations for transmissions of multiple sidelink TBs indicated in DCI using with a common TDRA and a common FDRA.

As shown in FIG. 10, in some aspects, the DCI may indicate a common TDRA and a common FDRA for all of the multiple sidelink TBs (e.g., for DG resource allocations for the multiple sidelink TBs). The common TDRA and the common FDRA may be shared for all of the sidelink TBs. In this case, the DCI may include additional fields that indicate a TB-specific TDRA and FDRA, within the common TDRA and the common FDRA, for each sidelink TB. In some aspects, the DCI may indicate at least one of a TDM pattern, an FDM pattern, or an SDM pattern for transmitting the sidelink TBs using the common TDRA and common FDRA. As shown in FIG. 10, a TDM pattern (e.g., indicated in TDM bit fields for each sidelink TB) and an FDM pattern (e.g., indicated in FDM bit fields for each sidelink TB) indicated in the DCI are applied to multiplex the common TDRA and common FDRA into respective resource allocations for a first TB (TB1), a second TB (TB2), a third TB (TB3), and a fourth TB (TB4).

In the example of FIG. 10, scheduling information that indicates resource allocations for transmissions of multiple sidelink TBs is included in DCI. In other examples, the scheduling information that indicates resource allocations for transmission of multiple sidelink TBs may be transmitted via RRC signaling As indicated above, FIG. 10 is provided as an example. Other examples may differ from what is described with respect to FIG. 10.

Figure 11:
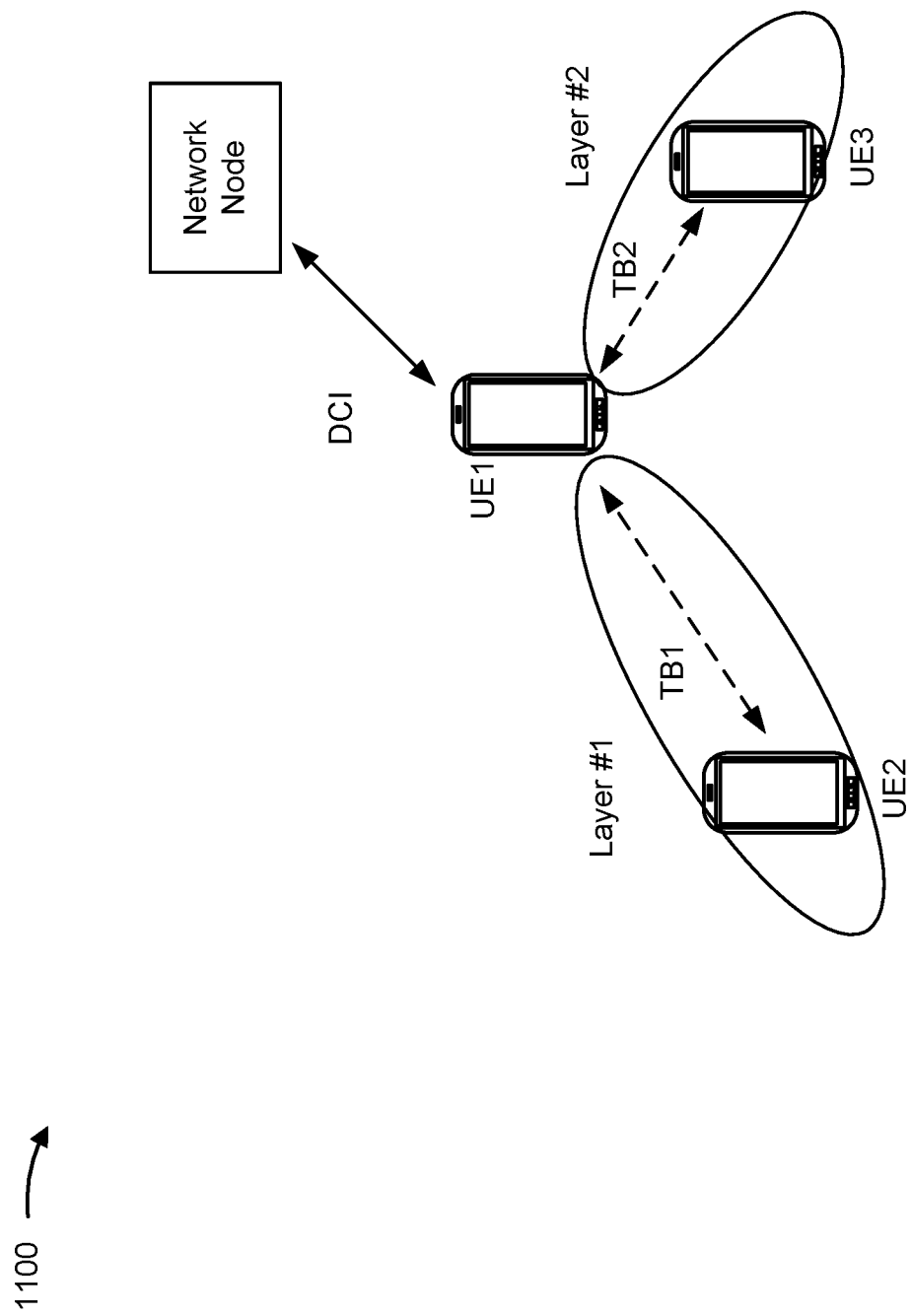

FIG. 11 is a diagram illustrating an example 1100 associated with multi-TB sidelink scheduling, in accordance with the present disclosure. As shown in FIG. 11, example 1100 includes a network node (e.g., network node 705, base station 110, CU 310, DU 330, RU 340, or a combination thereof), a first UE (UE1), and a second UE (UE2). The network node may transmit, to UE1, DCI that indicates resource allocations for multiple sidelink TBs and indicates one or more Rx UEs associated with the multiple sidelink TBs. As shown in example 1100, in some aspects the DCI may indicate different spatial layers for different sidelink TBs. For example, the DCI may indicate a first spatial layer (Layer #1) for transmission of a first sidelink TB (TB1) from UE1 to UE2, and the DCI may indicate a second spatial layer (Layer #2) for transmission of a second sidelink TB (TB2) from UE1 to UE3. The UE1 may transmit TB1 to UE2 using Layer #1, and the UE1 may transmit TB2 to UE3 using Layer #2. In some aspects, the DCI may include a common TDRA and a common FDRA for all of the sidelink TBs (e.g., TB1 and TB2), and the DCI may include indications of different DMRS ports that indicate different spatial layers (e.g., Layer #1 and Layer #2) for the sidelink TBs (e.g., TB1 and TB2). In this way the network node may increase spatial re-use of sidelink resources.

In the example of FIG. 11, scheduling information that indicates resource allocations for transmissions of multiple sidelink TBs is included in DCI. In other examples, the scheduling information that indicates resource allocations for transmission of multiple sidelink TBs may be transmitted via RRC signaling As indicated above, FIG. 11 is provided as an example. Other examples may differ from what is described with respect to FIG. 11.

Figure 12:
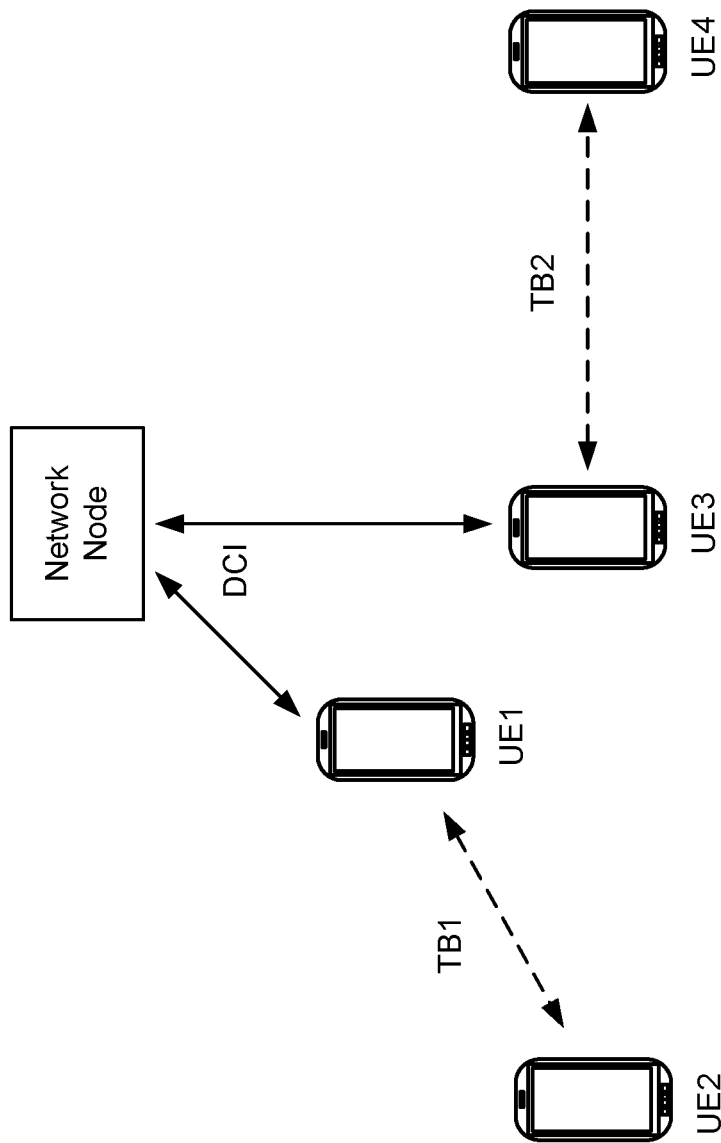

FIG. 12 is a diagram illustrating an example 1200 associated with multi-TB sidelink scheduling, in accordance with the present disclosure. As shown in FIG. 12, example 1200 includes a network node (e.g., network node 705, base station 110, CU 310, DU 330, RU 340, or a combination thereof), a first UE (UE1), and a second UE (UE2), a third UE (UE3), and a fourth UE (UE4). The network node may transmit, to UE1 and UE3, DCI that indicates resource allocations for multiple sidelink TBs and indicates one or more Rx UEs associated with the multiple sidelink TBs. For example, the DCI may indicate a resource allocation for a transmission of a first sidelink TB (TB1) from UE1 to UE2 and a resource allocation for a transmission of a second sidelink TB for UE3 to UE4. In some aspects, due to the network node specifying the Rx UEs (e.g., UE2 and UE4) for TB1 and TB2 in the DCI, the network node may have knowledge of the beam directions for the transmissions of TB1 and TB2 from UE1 and UE3, respectively. Based at least in part on a determination that the beam directions for the transmissions of TB1 and TB2 do not overlap (or will not interfere with each other), the network node may allocate, in the DCI, the same or overlapping sidelink resources (e.g., time and frequency resources) for the transmissions of TB1 and TB2. As a result, increased resources may be used by the network node for sidelink scheduling without significantly increasing interference between sidelink communications.

In the example of FIG. 12, scheduling information that indicates resource allocations for transmissions of multiple sidelink TBs is included in DCI. In other examples, the scheduling information that indicates resource allocations for transmission of multiple sidelink TBs may be transmitted via RRC signaling As indicated above, FIG. 12 is provided as an example. Other examples may differ from what is described with respect to FIG. 12.

Figure 13:
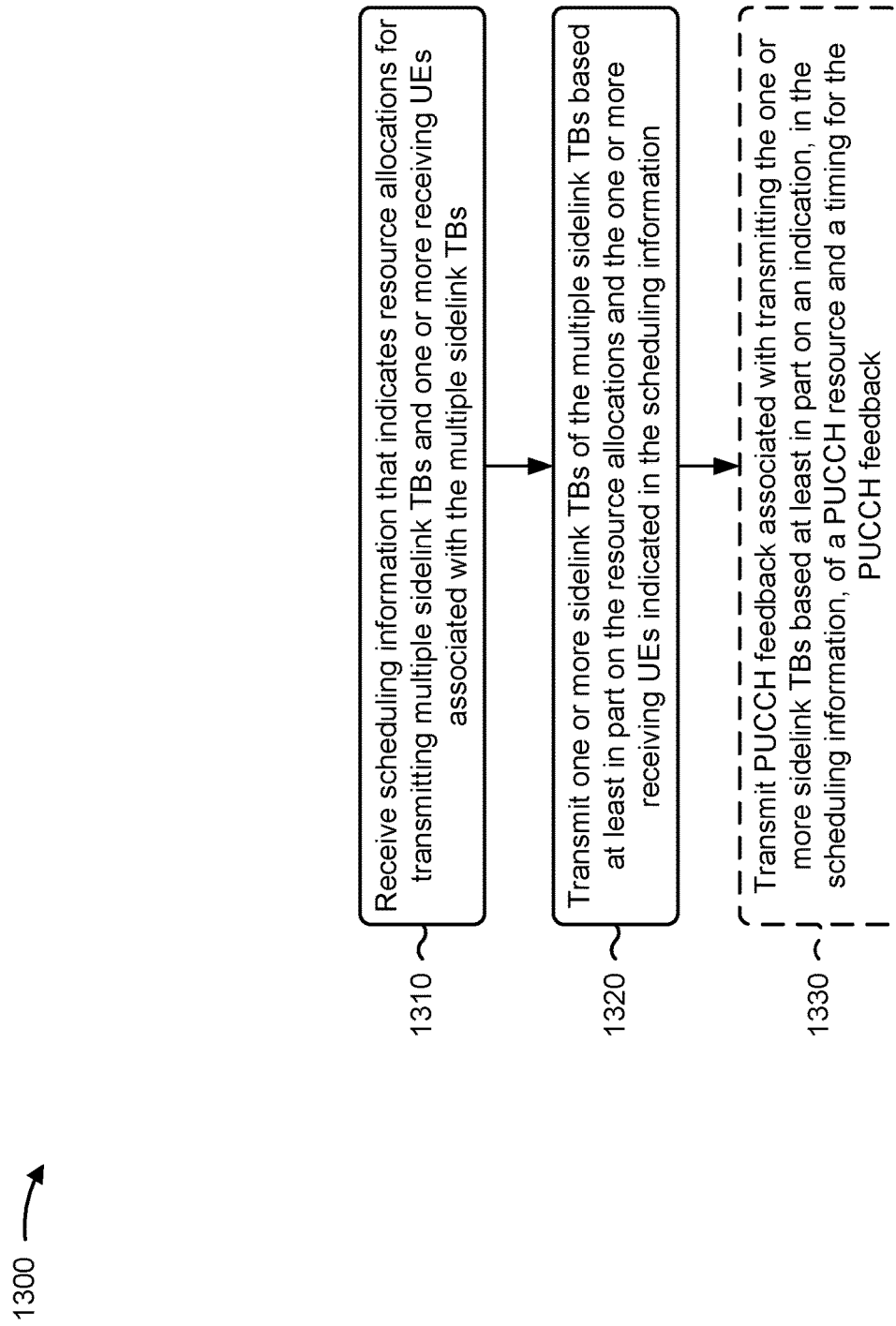
FIGS. 13-14 are diagrams illustrating example processes associated with multi-TB sidelink scheduling, in accordance with the present disclosure.

FIG. 13 is a diagram illustrating an example process 1300 performed, for example, by a UE, in accordance with the present disclosure. Example process 1300 is an example where the UE (e.g., UE 120) performs operations associated with multi-TB sidelink scheduling.

As shown in FIG. 13, in some aspects, process 1300 may include receiving, from a network node, scheduling information that indicates resource allocations for transmitting multiple sidelink TBs and one or more receiving UEs associated with the multiple sidelink TBs (block 1310). For example, the UE (e.g., using communication manager 140 and/or reception component 1502, depicted in FIG. 15) may receive, from a network node, scheduling information that indicates resource allocations for transmitting multiple sidelink TBs and one or more receiving UEs associated with the multiple sidelink TBs, as described above.

As further shown in FIG. 13, in some aspects, process 1300 may include transmitting one or more sidelink TBs of the multiple sidelink TBs based at least in part on the resource allocations and the one or more receiving UEs indicated in the scheduling information (block 1320). For example, the UE (e.g., using communication manager 140 and/or transmission component 1504, depicted in FIG. 15) may transmit one or more sidelink TBs of the multiple sidelink TBs based at least in part on the resource allocations and the one or more receiving UEs indicated in the scheduling information, as described above.

As further shown in FIG. 13, in some aspects, process 1300 may include transmitting, to the network node, PUCCH feedback associated with transmitting the one or more sidelink TBs based at least in part on an indication, included in the scheduling information, of a PUCCH resource and a timing for the PUCCH feedback (block 1330). For example, the UE (e.g., using communication manager 140 and/or transmission component 1504, depicted in FIG. 15) may transmit, to the network node, PUCCH feedback associated with transmitting the one or more sidelink TBs based at least in part on an indication, included in the scheduling information, of a PUCCH resource and a timing for the PUCCH feedback, as described above.

Process 1300 may include additional aspects, such as any single aspect or any combination of aspects described below and/or in connection with one or more other processes described elsewhere herein.

In a first aspect, the resource allocations for transmitting the multiple sidelink TBs include resource allocations for transmissions of the multiple sidelink TBs from the UE to an indicated receiving UE, and transmitting the one or more sidelink TBs includes transmitting, to the indicated receiving UE, the multiple sidelink TBs based at least in part on the resource allocations indicated in the scheduling information.

In a second aspect, the one or more receiving UEs include a plurality of receiving UEs, the scheduling information indicates a respective receiving UE, of the plurality of receiving UEs, for each sidelink TB of the multiple sidelink TBs, and transmitting the one or more sidelink TBs includes transmitting each of the one or more sidelink TBs, of the multiple sidelink TBs, to the respective receiving UE indicated for that sidelink TB in the scheduling information based at least in part on the resource allocations indicated in the scheduling information.

In a third aspect, the scheduling information includes, for each sidelink TB of the multiple sidelink TBs, an indication of a respective receiving UE identifier corresponding to the respective receiving UE for that sidelink TB.

In a fourth aspect, the resource allocation for transmitting each sidelink TB, of the multiple sidelink TBs, is included in the scheduling information in a reading position associated with the respective receiving UE for that sidelink TB.

In a fifth aspect, the scheduling information is scrambled using a cyclic redundancy check sequence associated with a group of UEs, and the scheduling information identifies the respective receiving UE for each sidelink TB, of the multiple sidelink TBs, from the group of UEs.

In a sixth aspect, a control channel element index associated with the scheduling information corresponds to a group of UEs, and the scheduling information identifies the respective receiving UE for each sidelink TB, of the multiple sidelink TBs, from the group of UEs.

In a seventh aspect, the resource allocations for transmitting the multiple sidelink TBs include resource allocations for transmissions of the multiple sidelink TBs from the UE.

In an eighth aspect, the scheduling information includes a transmitting UE identifier that indicates that the UE is a transmitting UE for the multiple sidelink TBs, and the scheduling information includes, for each sidelink TB of the multiple sidelink TBs, an indication of a respective receiving UE identifier corresponding to the respective receiving UE for that sidelink TB.

In a ninth aspect, the resource allocations for transmitting the multiple sidelink TBs include resource allocations for transmissions of the multiple sidelink TBs from a plurality of transmitting UEs, and the scheduling information indicates the respective receiving UE, of the plurality of receiving UEs, and a respective transmitting UE, of the plurality of transmitting UEs, for each sidelink TB of the multiple sidelink TBs.

In a tenth aspect, the scheduling information includes, for each sidelink TB of the multiple sidelink TBs, an indication of a respective receiving UE identifier corresponding to the respective receiving UE for that sidelink TB and an indication a respective transmitting UE identifier corresponding to the respective transmitting UE for that sidelink TB.

In an eleventh aspect, the resource allocations are dynamic grant resource allocations for transmitting the multiple sidelink TBs, and the scheduling information includes, for each sidelink TB, of the multiple sidelink TBs, respective indications of a resource pool, a modulation and coding scheme, a time gap, a time domain frequency allocation, a frequency domain resource allocation, and a new data indicator.

In a twelfth aspect, the resource allocations are dynamic grant resource allocations for transmitting the multiple sidelink TBs, the scheduling information indicates a common resource pool and time gap for the multiple sidelink TBs, and the scheduling information indicates a respective modulation and coding scheme, a respective time domain resource allocation, and a respective frequency domain resource allocation for each sidelink TB of the multiple sidelink TBs.

In a thirteenth aspect, the resource allocations are dynamic grant resource allocations for transmitting the multiple sidelink TBs, the scheduling information indicates a common time domain resource allocation and frequency domain resource allocation for the multiple sidelink TBs, and the scheduling information indicates at least one of a time domain multiplexing pattern, a frequency domain multiplexing pattern, or a spatial domain multiplexing pattern for transmitting the multiple sidelink TBs in the common time domain resource allocation and frequency domain resource allocation.

In a fourteenth aspect, the scheduling information indicates a respective modulation and coding scheme and a respective new data indicator for each sidelink TB of the multiple sidelink TBs.

In a fifteenth aspect, the scheduling information includes an indication of a common HARQ process number for the multiple sidelink TBs, and transmitting one or more sidelink TBs of the multiple sidelink TBs based at least in part on the resource allocations and the one or more receiving UEs indicated in the scheduling information includes transmitting, in sidelink control information associated with each of the one or more sidelink TBs, a respective HARQ process number for that sidelink TB determined based at least in part on the common HARQ process number.

In a sixteenth aspect, the resource allocations include multiple configured grant resource allocations for periodic transmissions of the multiple sidelink TBs.

In a seventeenth aspect, the scheduling information indicates a respective configured grant configuration index, a respective time domain resource allocation, and a respective frequency domain resource allocation for each configured grant resource allocation of the multiple configured grant resource allocations.

In an eighteenth aspect, the scheduling information indicates a common time domain resource allocation and frequency domain resource allocation for the multiple configured grant resource allocations, and the scheduling information indicates a respective configured grant configuration index and at least one of a time division multiplexing pattern, a frequency division multiplexing pattern, or a space division multiplexing pattern for each configured grant resource allocation of the multiple configured grant resource allocations.

In a nineteenth aspect, the scheduling information indicates a common configured grant configuration index for the multiple configured grant resource allocations, and the scheduling information indicates at least one of a respective time domain resource allocation and a respective frequency domain resource allocation for each configured grant resource allocation of the multiple configured grant resource allocations, or a common time domain resource allocation and frequency domain resource allocation for the multiple configured grant resource allocations, and at least one of a time division multiplexing pattern, a frequency division multiplexing pattern, or a space division multiplexing pattern for each configured grant resource allocation of the multiple configured grant resource allocations.

In a twentieth aspect, the indication of the PUCCH resource and the timing for the PUCCH feedback includes an indication that identifies multiple PUCCH resources and timings for PUCCH feedback associated with the multiple sidelink TBs.

In a twenty-first aspect, the scheduling information includes a respective indication of the PUCCH resource and the timing for the PUCCH feedback for each sidelink TB of the multiple sidelink TBs.

In a twenty-second aspect, the indication of the PUCCH resource and the timing for the PUCCH feedback includes an indication of a PUCCH resource and a timing for aggregated PUCCH feedback for the one or more sidelink TBs, of the multiple sidelink TBs, transmitted by the UE, and transmitting the PUCCH feedback includes transmitting, to the network node, the aggregated PUCCH feedback for the one or more sidelink TBs based at least in part on the indication of the PUCCH resource and the timing for the aggregated PUCCH feedback.

In a twenty-third aspect, the scheduling information includes an indication to increment a sidelink assignment indicator associated with the UE by a number of the multiple sidelink TBs allocated for transmission by the UE.

In a twenty-fourth aspect, the scheduling information includes an indication to increment a sidelink assignment indicator associated with the UE by one.

In a twenty-fifth aspect, scheduling information includes an indication to increment a sidelink assignment indicator associated with the UE by a number of feedback bits to be transmitted to the network node.

In a twenty-sixth aspect, process 1300 includes transmitting, to the network node, HARQ feedback associated with the one or more sidelink TBs using HARQ bundling based at least in part on a determination that a number of the one or more sidelink TBs is greater than the number of feedback bits to be transmitted to the network node.

In a twenty-seventh aspect, process 1300 includes transmitting, to the network node, multi-bit hybrid automatic repeat request feedback associated with the one or more sidelink TBs based at least in part on a determination that a number of the one or more sidelink TBs is less than the number of feedback bits to be transmitted to the network node.

In a twenty-eighth aspect, the scheduling information is DCI.

In a twenty-ninth aspect, the scheduling information is included in an RRC message.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
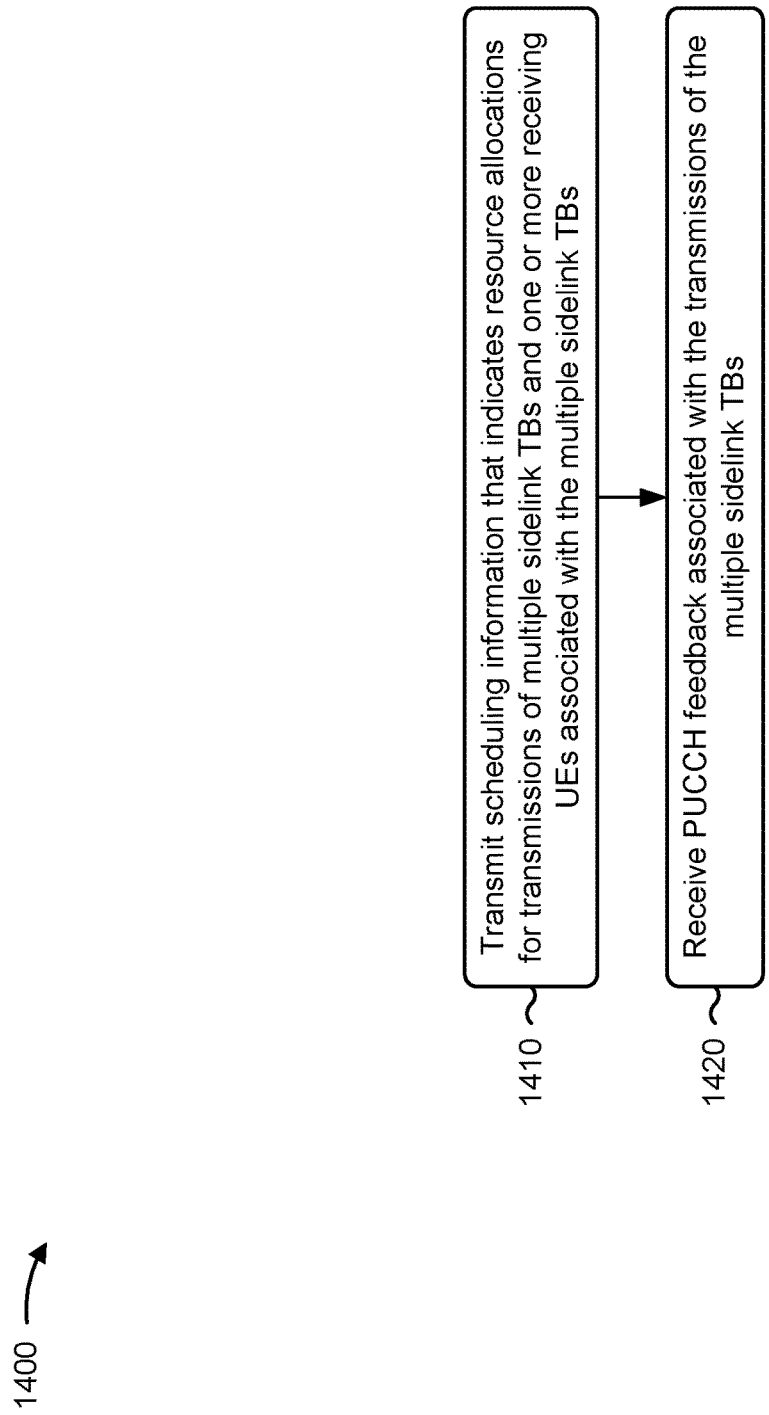

FIG. 14 is a diagram illustrating an example process 1400 performed, for example, by a network node, in accordance with the present disclosure. Example process 1400 is an example where the network node (e.g., network node 705) performs operations associated with multi-TB sidelink scheduling.

As shown in FIG. 14, in some aspects, process 1400 may include transmitting, to one or more UEs, scheduling information that indicates resource allocations for transmissions of multiple sidelink TBs and one or more receiving UEs associated with the multiple sidelink TBs (block 1410). For example, the network node (e.g., using communication manager 150 and/or transmission component 1604, depicted in FIG. 16) may transmit, to one or more UEs, scheduling information that indicates resource allocations for transmissions of multiple sidelink TBs and one or more receiving UEs associated with the multiple sidelink TBs, as described above.

As further shown in FIG. 14, in some aspects, process 1400 may include receiving PUCCH feedback associated with the transmissions of the multiple sidelink TBs (block 1420). For example, the network node (e.g., using communication manager 150 and/or reception component 1602, depicted in FIG. 16) may receive PUCCH feedback associated with the transmissions of the multiple sidelink TBs, as described above.

Process 1400 may include additional aspects, such as any single aspect or any combination of aspects described below and/or in connection with one or more other processes described elsewhere herein.

In a first aspect, transmitting the scheduling information includes transmitting the scheduling information to a transmitting UE, the resource allocations for transmitting the multiple sidelink TBs include resource allocations for transmissions of the multiple sidelink TBs from the transmitting UE to an indicated receiving UE.

In a second aspect, the one or more receiving UEs include a plurality of receiving UEs, and the scheduling information indicates a respective receiving UE, of the plurality of receiving UEs, for each sidelink TB of the multiple sidelink TBs.

In a third aspect, the scheduling information includes, for each sidelink TB of the multiple sidelink TBs, an indication of a respective receiving UE identifier corresponding to the respective receiving UE for that sidelink TB.

In a fourth aspect, the resource allocation for transmitting each sidelink TB, of the multiple sidelink TBs, is included in the scheduling information in a reading position associated with the respective receiving UE for that sidelink TB.

In a fifth aspect, the scheduling information is scrambled using a cyclic redundancy check sequence associated with a group of UEs, and the scheduling information identifies the respective receiving UE for each sidelink TB, of the multiple sidelink TBs, from the group of UEs.

In a sixth aspect, a control channel element index associated with the scheduling information corresponds to a group of UEs, and the scheduling information identifies the respective receiving UE for each sidelink TB, of the multiple sidelink TBs, from the group of UEs.

In a seventh aspect, the resource allocations for transmitting the multiple sidelink TBs include resource allocations for transmissions of the multiple sidelink TBs from a transmitting UE of the one or more UEs, the scheduling information includes an indication of a transmitting UE identifier corresponding to the transmitting UE, and the scheduling information includes, for each sidelink TB of the multiple sidelink TBs, an indication of a respective receiving UE identifier corresponding to the respective receiving UE for that sidelink TB.

In an eighth aspect, the resource allocations for transmitting the multiple sidelink TBs include resource allocations for transmissions of the multiple sidelink TBs from a plurality of transmitting UEs, and the scheduling information indicates the respective receiving UE, of the plurality of receiving UEs, and a respective transmitting UE, of the plurality of transmitting UEs, for each sidelink TB of the multiple sidelink TBs.

In a ninth aspect, the scheduling information includes, for each sidelink TB of the multiple sidelink TBs, an indication of a respective receiving UE identifier corresponding to the respective receiving UE for that sidelink TB and an indication a respective transmitting UE identifier corresponding to the respective transmitting UE for that sidelink TB.

In a tenth aspect, the resource allocations are dynamic grant resource allocations for transmitting the multiple sidelink TBs, and the scheduling information includes, for each sidelink TB, of the multiple sidelink TBs, respective indications of a resource pool, a modulation and coding scheme, a time gap, a time domain frequency allocation, a frequency domain resource allocation, and a new data indicator.

In an eleventh aspect, the resource allocations are dynamic grant resource allocations for transmitting the multiple sidelink TBs, the scheduling information indicates a common resource pool and time gap for the multiple sidelink TBs, and the scheduling information indicates a respective modulation and coding scheme, a respective time domain resource allocation, and a respective frequency domain resource allocation for each sidelink TB of the multiple sidelink TBs.

In a twelfth aspect, the resource allocations are dynamic grant resource allocations for transmitting the multiple sidelink TBs, the scheduling information indicates a common time domain resource allocation and frequency domain resource allocation for the multiple sidelink TBs, and the scheduling information indicates at least one of a time domain multiplexing pattern, a frequency domain multiplexing pattern, or a spatial domain multiplexing pattern for transmitting the multiple sidelink TBs in the common time domain resource allocation and frequency domain resource allocation.

In a thirteenth aspect, the scheduling information indicates a respective modulation and coding scheme and a respective new data indicator for each sidelink TB of the multiple sidelink TBs.

In a fourteenth aspect, the scheduling information includes an indication of a common HARQ process number for the multiple sidelink TBs.

In a fifteenth aspect, the resource allocations include multiple configured grant resource allocations for periodic transmissions of the multiple sidelink TBs.

In a sixteenth aspect, the scheduling information indicates a respective configured grant configuration index, a respective time domain resource allocation, and a respective frequency domain resource allocation for each configured grant resource allocation of the multiple configured grant resource allocations.

In a seventeenth aspect, the scheduling information indicates a common time domain resource allocation and frequency domain resource allocation for the multiple configured grant resource allocations, and the scheduling information indicates a respective configured grant configuration index and at least one of a time division multiplexing pattern, a frequency division multiplexing pattern, or a space division multiplexing pattern for each configured grant resource allocation of the multiple configured grant resource allocations.

In an eighteenth aspect, the scheduling information indicates a common configured grant configuration index for the multiple configured grant resource allocations, and the scheduling information indicates at least one of a respective time domain resource allocation and a respective frequency domain resource allocation for each configured grant resource allocation of the multiple configured grant resource allocations, or a common time domain resource allocation and frequency domain resource allocation for the multiple configured grant resource allocations, and at least one of a time division multiplexing pattern, a frequency division multiplexing pattern, or a space division multiplexing pattern for each configured grant resource allocation of the multiple configured grant resource allocations.

In a nineteenth aspect, process 1400 includes receiving, from the one or more UEs, the PUCCH feedback associated with the transmissions of the multiple TBs in accordance with at least one indication, included in the scheduling information, of a PUCCH resource and a timing for the PUCCH feedback.

In a twentieth aspect, the at least one indication of the PUCCH resource and the timing for the PUCCH feedback includes an indication that identifies multiple PUCCH resources and timings for PUCCH feedback associated with the multiple sidelink TBs.

In a twenty-first aspect, the at least one indication of the PUCCH resource and the time for the PUCCH feedback includes a respective indication of the PUCCH resource and the timing for the PUCCH feedback for each sidelink TB of the multiple sidelink TBs.

In a twenty-second aspect, the at least one indication of the PUCCH resource and the timing for the PUCCH feedback includes, for each UE of the one or more UEs, a respective indication of a PUCCH resource and a timing for aggregated PUCCH feedback for one or more of the multiple sidelink TBs to be transmitted by that UE, and receiving, from the one or more UEs, the PUCCH feedback associated with the transmissions of the one or more sidelink TBs includes receiving, from each UE of the one or more UEs, the aggregated PUCCH feedback for the one or more of the sidelink TBs to be transmitted by that UE in accordance with the respective indication of the PUCCH resource and the timing for the aggregated PUCCH feedback.

In a twenty-third aspect, receiving the PUCCH feedback associated with the transmissions of the multiple sidelink TBs receiving, from the one or more receiving UEs, one or more PUCCH communications including sidelink hybrid automatic repeat response feedback associated with the transmissions of the multiple TBs to the one or more receiving UEs in accordance with at least one indication, included in the scheduling information, of a PUCCH resource and a timing for the PUCCH feedback.

In a twenty-fourth aspect, the scheduling information includes an indication to increment a respective sidelink assignment indicator associated with each UE of the one or more UEs by a number of the multiple sidelink TBs allocated for transmission by that UE.

In a twenty-fifth aspect, the scheduling information includes an indication to increment a respective sidelink assignment indicator associated with each UE of the one or more UEs by one.

In a twenty-sixth aspect, scheduling information includes an indication to increment a respective sidelink assignment indicator associated with each UE of the one or more UEs by a number of feedback bits to be transmitted to the network node by that UE.

In a twenty-seventh aspect, the scheduling information is DCI.

In a twenty-eighth aspect, the scheduling information is included in an RRC message, Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
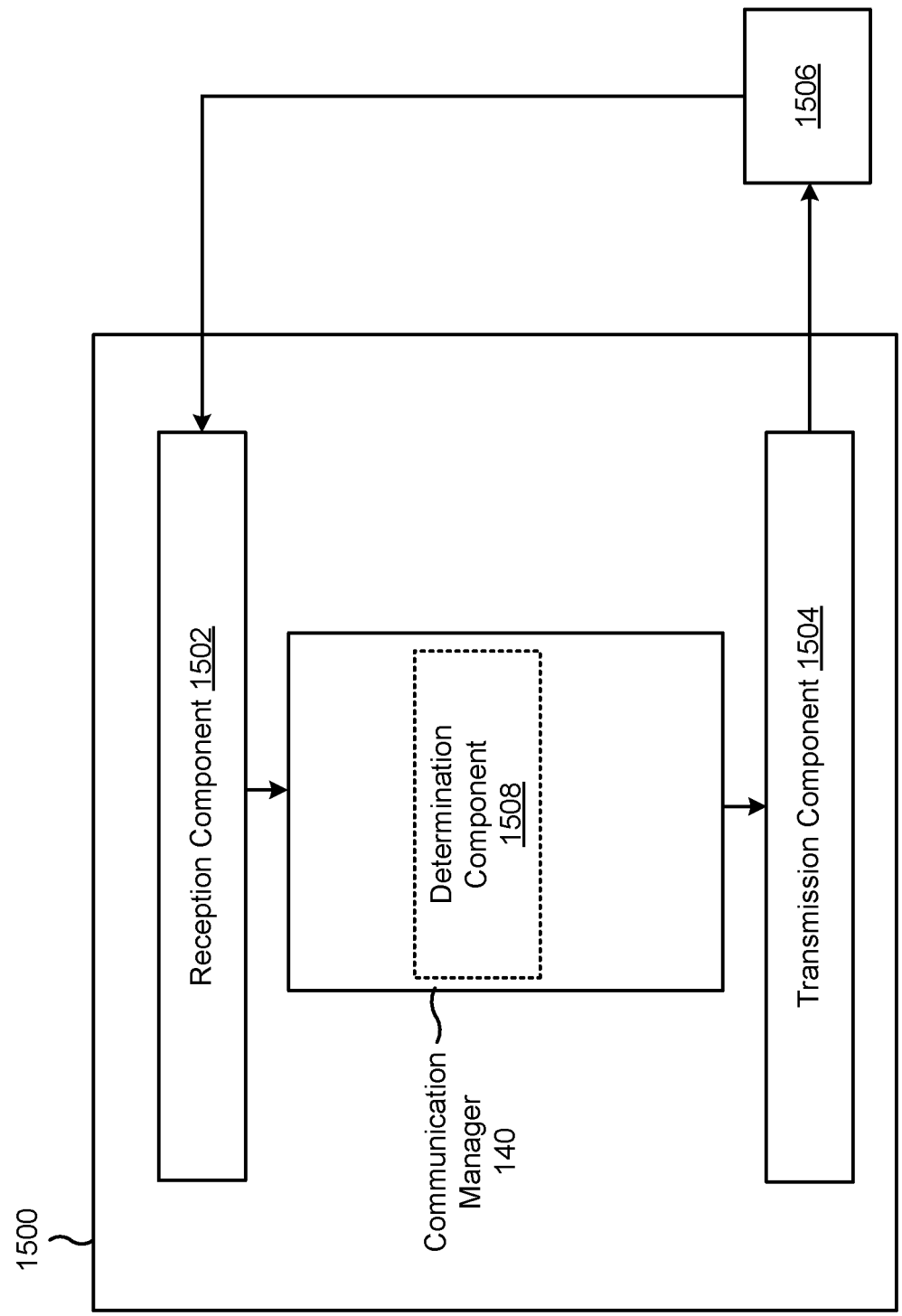
FIGS. 15-16 are diagrams of example apparatuses for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a determination component 1508, among other examples.

In some aspects, the apparatus 1500 may be configured to perform one or more operations described herein in connection with FIGS. 7-12. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The reception component 1502 may receive, from a network node, scheduling information that indicates resource allocations for transmitting multiple sidelink TBs and one or more receiving UEs associated with the multiple sidelink TBs. The transmission component 1504 may transmit one or more sidelink TBs of the multiple sidelink TBs based at least in part on the resource allocations and the one or more receiving UEs indicated in the scheduling information.

The determination component 1508 may determine the resource allocations for transmitting the one or more sidelink TBs of the multiple sidelink TBs based at least in part on the scheduling information.

The transmission component 1504 may transmit, to the network node, PUCCH feedback associated with transmitting the one or more sidelink TBs based at least in part on an indication, included in the scheduling information, of a PUCCH resource and a timing for the PUCCH feedback.

The transmission component 1504 may transmit, to the network node, HARQ feedback associated with the one or more sidelink TBs using HARQ bundling based at least in part on a determination that a number of the one or more sidelink TBs is greater than the number of feedback bits to be transmitted to the network node.

The transmission component 1504 may transmit, to the network node, multi-bit hybrid automatic repeat request feedback associated with the one or more sidelink TBs based at least in part on a determination that a number of the one or more sidelink TBs is less than the number of feedback bits to be transmitted to the network node.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
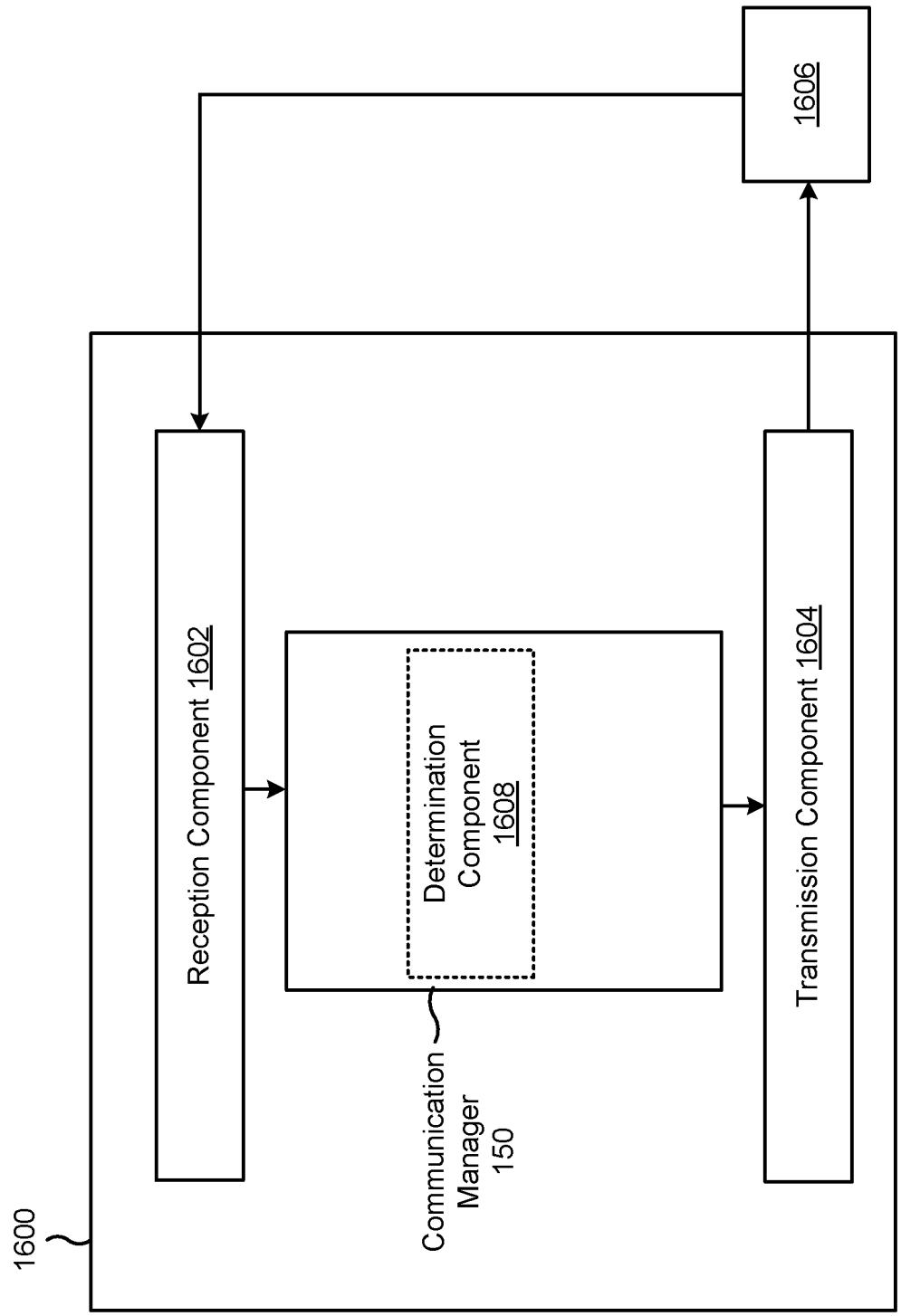

FIG. 16 is a diagram of an example apparatus 1600 for wireless communication. The apparatus 1600 may be a network node, or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a determination component 1608, among other examples.

In some aspects, the apparatus 1600 may be configured to perform one or more operations described herein in connection with FIGS. 7-12. Additionally, or alternatively, the apparatus 1600 may be configured to perform one or more processes described herein, such as process 1400 of FIG. 14, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The transmission component 1604 may transmit, to one or more UEs, scheduling information that indicates resource allocations for transmissions of multiple sidelink TBs and one or more receiving UEs associated with the multiple sidelink TBs. The reception component 1602 may receive PUCCH feedback associated with the transmissions of the multiple sidelink TBs.

The determination component 1608 may determine the resource allocations for the transmissions of the multiple sidelink TBs.

The reception component 1602 may receive, from the one or more UEs, the PUCCH feedback associated with the transmissions of the multiple TBs in accordance with at least one indication, included in the scheduling information, of a PUCCH resource and a timing for the PUCCH feedback.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving, from a network node, scheduling information that indicates resource allocations for transmitting multiple sidelink transport blocks (TBs) and one or more receiving UEs associated with the multiple sidelink TBs; and transmitting one or more sidelink TBs of the multiple sidelink TBs based at least in part on the resource allocations and the one or more receiving UEs indicated in the scheduling information.

Aspect 2: The method of Aspect 1, wherein the resource allocations for transmitting the multiple sidelink TBs include resource allocations for transmissions of the multiple sidelink TBs from the UE to an indicated receiving UE, and wherein transmitting the one or more sidelink TBs comprises: transmitting, to the indicated receiving UE, the multiple sidelink TBs based at least in part on the resource allocations indicated in the scheduling information.

Aspect 3: The method of Aspect 1, wherein the one or more receiving UEs include a plurality of receiving UEs, wherein the scheduling information indicates a respective receiving UE, of the plurality of receiving UEs, for each sidelink TB of the multiple sidelink TBs, and wherein transmitting the one or more sidelink TBs comprises: transmitting each of the one or more sidelink TBs, of the multiple sidelink TBs, to the respective receiving UE indicated for that sidelink TB in the scheduling information based at least in part on the resource allocations indicated in the scheduling information.

Aspect 4: The method of Aspect 3, wherein the scheduling information includes, for each sidelink TB of the multiple sidelink TBs, an indication of a respective receiving UE identifier corresponding to the respective receiving UE for that sidelink TB.

Aspect 5: The method of Aspect 3, wherein the resource allocation for transmitting each sidelink TB, of the multiple sidelink TBs, is included in the scheduling information in a reading position associated with the respective receiving UE for that sidelink TB.

Aspect 6: The method of any of Aspects 3-5, wherein the scheduling information is scrambled using a cyclic redundancy check sequence associated with a group of UEs, and wherein the scheduling information identifies the respective receiving UE for each sidelink TB, of the multiple sidelink TBs, from the group of UEs.

Aspect 7: The method of any of Aspects 3-5, wherein a control channel element index associated with the scheduling information corresponds to a group of UEs, and wherein the scheduling information identifies the respective receiving UE for each sidelink TB, of the multiple sidelink TBs, from the group of UEs.

Aspect 8: The method of any of Aspects 3-7, wherein the resource allocations for transmitting the multiple sidelink TBs include resource allocations for transmissions of the multiple sidelink TBs from the UE.

Aspect 9: The method of Aspect 8, wherein the scheduling information includes a transmitting UE identifier that indicates that the UE is a transmitting UE for the multiple sidelink TBs, and wherein the scheduling information includes, for each sidelink TB of the multiple sidelink TBs, an indication of a respective receiving UE identifier corresponding to the respective receiving UE for that sidelink TB.

Aspect 10: The method of any of Aspects 3-7, wherein the resource allocations for transmitting the multiple sidelink TBs include resource allocations for transmissions of the multiple sidelink TBs from a plurality of transmitting UEs, and wherein the scheduling information indicates the respective receiving UE, of the plurality of receiving UEs, and a respective transmitting UE, of the plurality of transmitting UEs, for each sidelink TB of the multiple sidelink TBs.

Aspect 11: The method of Aspect 10, wherein the scheduling information includes, for each sidelink TB of the multiple sidelink TBs, an indication of a respective receiving UE identifier corresponding to the respective receiving UE for that sidelink TB and an indication a respective transmitting UE identifier corresponding to the respective transmitting UE for that sidelink TB.

Aspect 12: The method of any of Aspects 1-11, wherein the resource allocations are dynamic grant resource allocations for transmitting the multiple sidelink TBs, and wherein the scheduling information includes, for each sidelink TB, of the multiple sidelink TBs, respective indications of a resource pool, a modulation and coding scheme, a time gap, a time domain frequency allocation, a frequency domain resource allocation, and a new data indicator.

Aspect 13: The method of any of Aspects 1-11, wherein the resource allocations are dynamic grant resource allocations for transmitting the multiple sidelink TBs, wherein the scheduling information indicates a common resource pool and time gap for the multiple sidelink TBs, and wherein the scheduling information indicates a respective modulation and coding scheme, a respective time domain resource allocation, and a respective frequency domain resource allocation for each sidelink TB of the multiple sidelink TBs.

Aspect 14: The method of any of Aspects 1-11, wherein the resource allocations are dynamic grant resource allocations for transmitting the multiple sidelink TBs, wherein the scheduling information indicates a common time domain resource allocation and frequency domain resource allocation for the multiple sidelink TBs, and wherein the scheduling information indicates at least one of a time domain multiplexing pattern, a frequency domain multiplexing pattern, or a spatial domain multiplexing pattern for transmitting the multiple sidelink TBs in the common time domain resource allocation and frequency domain resource allocation.

Aspect 15: The method of Aspect 14, wherein the scheduling information indicates a respective modulation and coding scheme and a respective new data indicator for each sidelink TB of the multiple sidelink TBs.

Aspect 16: The method of any of Aspects 1-15, wherein the scheduling information includes an indication of a common hybrid automatic repeat request (HARQ) process number for the multiple sidelink TBs, and wherein transmitting one or more sidelink TBs of the multiple sidelink TBs based at least in part on the resource allocations and the one or more receiving UEs indicated in the scheduling information comprises: transmitting, in sidelink control information associated with each of the one or more sidelink TBs, a respective HARQ process number for that sidelink TB determined based at least in part on the common HARQ process number.

Aspect 17: The method of any of Aspects 1-11, wherein the resource allocations include multiple configured grant resource allocations for periodic transmissions of the multiple sidelink TBs.

Aspect 18: The method of Aspect 17, wherein the scheduling information indicates a respective configured grant configuration index, a respective time domain resource allocation, and a respective frequency domain resource allocation for each configured grant resource allocation of the multiple configured grant resource allocations.

Aspect 19: The method of Aspect 17, wherein the scheduling information indicates a common time domain resource allocation and frequency domain resource allocation for the multiple configured grant resource allocations, wherein the scheduling information indicates a respective configured grant configuration index and at least one of a time division multiplexing pattern, a frequency division multiplexing pattern, or a space division multiplexing pattern for each configured grant resource allocation of the multiple configured grant resource allocations.

Aspect 20: The method of Aspect 17, wherein the scheduling information indicates a common configured grant configuration index for the multiple configured grant resource allocations, and wherein the scheduling information indicates at least one of: a respective time domain resource allocation and a respective frequency domain resource allocation for each configured grant resource allocation of the multiple configured grant resource allocations, or a common time domain resource allocation and frequency domain resource allocation for the multiple configured grant resource allocations, and at least one of a time division multiplexing pattern, a frequency division multiplexing pattern, or a space division multiplexing pattern for each configured grant resource allocation of the multiple configured grant resource allocations.

Aspect 21: The method of any of Aspects 1-20, further comprising: transmitting, to the network node, physical uplink control channel (PUCCH) feedback associated with transmitting the one or more sidelink TBs based at least in part on an indication, included in the scheduling information, of a PUCCH resource and a timing for the PUCCH feedback.

Aspect 22: The method of Aspect 21, wherein the indication of the PUCCH resource and the timing for the PUCCH feedback includes an indication that identifies multiple PUCCH resources and timings for PUCCH feedback associated with the multiple sidelink TBs.

Aspect 23: The method of Aspect 21, wherein the scheduling information includes a respective indication of the PUCCH resource and the timing for the PUCCH feedback for each sidelink TB of the multiple sidelink TBs.

Aspect 24: The method of Aspect 21, wherein the indication of the PUCCH resource and the timing for the PUCCH feedback includes an indication of a PUCCH resource and a timing for aggregated PUCCH feedback for the one or more sidelink TBs, of the multiple sidelink TBs, transmitted by the UE, and wherein transmitting the PUCCH feedback comprises: transmitting, to the network node, the aggregated PUCCH feedback for the one or more sidelink TBs based at least in part on the indication of the PUCCH resource and the timing for the aggregated PUCCH feedback.

Aspect 25: The method of any of Aspects 1-24, wherein the scheduling information includes an indication to increment a sidelink assignment indicator associated with the UE by a number of the multiple sidelink TBs allocated for transmission by the UE.

Aspect 26: The method of any of Aspects 1-24, wherein the scheduling information includes an indication to increment a sidelink assignment indicator associated with the UE by one.

Aspect 27: The method of any of Aspects 1-24, wherein the scheduling information includes an indication to increment a sidelink assignment indicator associated with the UE by a number of feedback bits to be transmitted to the network node.

Aspect 28: The method of Aspect 27, further comprising: transmitting, to the network node, hybrid automatic repeat request (HARQ) feedback associated with the one or more sidelink TBs using HARQ bundling based at least in part on a determination that a number of the one or more sidelink TBs is greater than the number of feedback bits to be transmitted to the network node.

Aspect 29: The method of any of Aspects 27-28, further comprising: transmitting, to the network node, multi-bit hybrid automatic repeat request feedback associated with the one or more sidelink TBs based at least in part on a determination that a number of the one or more sidelink TBs is less than the number of feedback bits to be transmitted to the network node.

Aspect 30: The method of any of Aspects 1-29, wherein the scheduling information is downlink control information (DCI).

Aspect 31: The method of any of Aspects 1-29, wherein the scheduling information is included in a radio resource control (RRC) message.

Aspect 32: A method of wireless communication performed by a network node, comprising: transmitting, to one or more user equipments (UEs), scheduling information that indicates resource allocations for transmissions of multiple sidelink transport blocks (TBs) and one or more receiving UEs associated with the multiple sidelink TBs; and receiving physical uplink control channel (PUCCH) feedback associated with the transmissions of the multiple sidelink TBs.

Aspect 33: The method of Aspect 32, wherein transmitting the scheduling information comprises: transmitting the scheduling information to a transmitting UE, the resource allocations for transmitting the multiple sidelink TBs include resource allocations for transmissions of the multiple sidelink TBs from the transmitting UE to an indicated receiving UE.

Aspect 34: The method of Aspect 32, wherein the one or more receiving UEs include a plurality of receiving UEs, wherein the scheduling information indicates a respective receiving UE, of the plurality of receiving UEs, for each sidelink TB of the multiple sidelink TBs.

Aspect 35: The method of Aspect 34, wherein the scheduling information includes, for each sidelink TB of the multiple sidelink TBs, an indication of a respective receiving UE identifier corresponding to the respective receiving UE for that sidelink TB.

Aspect 36: The method of Aspect 34, wherein the resource allocation for transmitting each sidelink TB, of the multiple sidelink TBs, is included in the scheduling information in a reading position associated with the respective receiving UE for that sidelink TB.

Aspect 37: The method of any of Aspects 34-36, wherein the scheduling information is scrambled using a cyclic redundancy check sequence associated with a group of UEs, and wherein the scheduling information identifies the respective receiving UE for each sidelink TB, of the multiple sidelink TBs, from the group of UEs.

Aspect 38: The method of any of Aspects 34-36, wherein a control channel element index associated with the scheduling information corresponds to a group of UEs, and wherein the scheduling information identifies the respective receiving UE for each sidelink TB, of the multiple sidelink TBs, from the group of UEs.

Aspect 39: The method of any of Aspects 34-38, wherein the resource allocations for transmitting the multiple sidelink TBs include resource allocations for transmissions of the multiple sidelink TBs from a transmitting UE of the one or more UEs, wherein the scheduling information includes an indication of a transmitting UE identifier corresponding to the transmitting UE, and wherein the scheduling information includes, for each sidelink TB of the multiple sidelink TBs, an indication of a respective receiving UE identifier corresponding to the respective receiving UE for that sidelink TB.

Aspect 40: The method of any of Aspects 34-38, wherein the resource allocations for transmitting the multiple sidelink TBs include resource allocations for transmissions of the multiple sidelink TBs from a plurality of transmitting UEs, and wherein the scheduling information indicates the respective receiving UE, of the plurality of receiving UEs, and a respective transmitting UE, of the plurality of transmitting UEs, for each sidelink TB of the multiple sidelink TBs.

Aspect 41: The method of Aspect 40, wherein the scheduling information includes, for each sidelink TB of the multiple sidelink TBs, an indication of a respective receiving UE identifier corresponding to the respective receiving UE for that sidelink TB and an indication a respective transmitting UE identifier corresponding to the respective transmitting UE for that sidelink TB.

Aspect 42: The method of any of Aspects 32-41, wherein the resource allocations are dynamic grant resource allocations for transmitting the multiple sidelink TBs, and wherein the scheduling information includes, for each sidelink TB, of the multiple sidelink TBs, respective indications of a resource pool, a modulation and coding scheme, a time gap, a time domain frequency allocation, a frequency domain resource allocation, and a new data indicator.

Aspect 43: The method of any of Aspects 32-41, wherein the resource allocations are dynamic grant resource allocations for transmitting the multiple sidelink TBs, wherein the scheduling information indicates a common resource pool and time gap for the multiple sidelink TBs, and wherein the scheduling information indicates a respective modulation and coding scheme, a respective time domain resource allocation, and a respective frequency domain resource allocation for each sidelink TB of the multiple sidelink TBs.

Aspect 44: The method of any of Aspects 32-41, wherein the resource allocations are dynamic grant resource allocations for transmitting the multiple sidelink TBs, wherein the scheduling information indicates a common time domain resource allocation and frequency domain resource allocation for the multiple sidelink TBs, and wherein the scheduling information indicates at least one of a time domain multiplexing pattern, a frequency domain multiplexing pattern, or a spatial domain multiplexing pattern for transmitting the multiple sidelink TBs in the common time domain resource allocation and frequency domain resource allocation.

Aspect 45: The method of Aspect 44, wherein the scheduling information indicates a respective modulation and coding scheme and a respective new data indicator for each sidelink TB of the multiple sidelink TBs.

Aspect 46: The method of any of Aspects 32-45, wherein the scheduling information includes an indication of a common hybrid automatic repeat request (HARQ) process number for the multiple sidelink TBs.

Aspect 47: The method of any of Aspects 32-41, wherein the resource allocations include multiple configured grant resource allocations for periodic transmissions of the multiple sidelink TBs.

Aspect 48: The method of Aspect 47, wherein the scheduling information indicates a respective configured grant configuration index, a respective time domain resource allocation, and a respective frequency domain resource allocation for each configured grant resource allocation of the multiple configured grant resource allocations.

Aspect 49: The method of Aspect 47, wherein the scheduling information indicates a common time domain resource allocation and frequency domain resource allocation for the multiple configured grant resource allocations, wherein the scheduling information indicates a respective configured grant configuration index and at least one of a time division multiplexing pattern, a frequency division multiplexing pattern, or a space division multiplexing pattern for each configured grant resource allocation of the multiple configured grant resource allocations.

Aspect 50: The method of Aspect 47, wherein the scheduling information indicates a common configured grant configuration index for the multiple configured grant resource allocations, and wherein the scheduling information indicates at least one of: a respective time domain resource allocation and a respective frequency domain resource allocation for each configured grant resource allocation of the multiple configured grant resource allocations, or a common time domain resource allocation and frequency domain resource allocation for the multiple configured grant resource allocations, and at least one of a time division multiplexing pattern, a frequency division multiplexing pattern, or a space division multiplexing pattern for each configured grant resource allocation of the multiple configured grant resource allocations.

Aspect 51: The method of any of Aspects 42-50, receiving the PUCCH feedback associated with the transmissions of the multiple sidelink TBs: receiving, from the one or more UEs, the PUCCH feedback associated with the transmissions of the multiple TBs in accordance with at least one indication, included in the scheduling information, of a PUCCH resource and a timing for the PUCCH feedback.

Aspect 52: The method of Aspect 51, wherein the at least one indication of the PUCCH resource and the timing for the PUCCH feedback includes an indication that identifies multiple PUCCH resources and timings for PUCCH feedback associated with the multiple sidelink TBs.

Aspect 53: The method of Aspect 51, wherein the at least one indication of the PUCCH resource and the time for the PUCCH feedback includes a respective indication of the PUCCH resource and the timing for the PUCCH feedback for each sidelink TB of the multiple sidelink TBs.

Aspect 54: The method of Aspect 51, wherein the at least one indication of the PUCCH resource and the timing for the PUCCH feedback includes, for each UE of the one or more UEs, a respective indication of a PUCCH resource and a timing for aggregated PUCCH feedback for one or more of the multiple sidelink TBs to be transmitted by that UE, and wherein receiving, from the one or more UEs, the PUCCH feedback associated with the transmissions of the one or more sidelink TBs comprises: receiving, from each UE of the one or more UEs, the aggregated PUCCH feedback for the one or more of the sidelink TBs to be transmitted by that UE in accordance with the respective indication of the PUCCH resource and the timing for the aggregated PUCCH feedback.

Aspect 55: The method of any of Aspects 32-50, wherein receiving the PUCCH feedback associated with the transmissions of the multiple sidelink TBs: receiving, from the one or more receiving UEs, one or more PUCCH communications including sidelink hybrid automatic repeat response feedback associated with the transmissions of the multiple TBs to the one or more receiving UEs in accordance with at least one indication, included in the scheduling information, of a PUCCH resource and a timing for the PUCCH feedback.

Aspect 56: The method of any of Aspects 32-55, wherein the scheduling information includes an indication to increment a respective sidelink assignment indicator associated with each UE of the one or more UEs by a number of the multiple sidelink TBs allocated for transmission by that UE.

Aspect 57: The method of any of Aspects 32-55, wherein the scheduling information includes an indication to increment a respective sidelink assignment indicator associated with each UE of the one or more UEs by one.

Aspect 58: The method of any of Aspects 32-55, wherein the scheduling information includes an indication to increment a respective sidelink assignment indicator associated with each UE of the one or more UEs by a number of feedback bits to be transmitted to the network node by that UE.

Aspect: 59: The method of any of Aspects 32-58, wherein the scheduling information is downlink control information (DCI).

Aspect 60: The method of any of Aspects 32-58, wherein the scheduling information is included in a radio resource control (RRC) message Aspect 61: An apparatus for wireless communication at a device, comprising a processor; memory coupled with the processor; and instructions stored in the memory and executable by the processor to cause the apparatus to perform the method of one or more of Aspects 1-31.

Aspect 62: A device for wireless communication, comprising a memory and one or more processors coupled to the memory, the one or more processors configured to perform the method of one or more of Aspects 1-31.

Aspect 63: An apparatus for wireless communication, comprising at least one means for performing the method of one or more of Aspects 1-31.

Aspect 64: A non-transitory computer-readable medium storing code for wireless communication, the code comprising instructions executable by a processor to perform the method of one or more of Aspects 1-31.

Aspect 65: A non-transitory computer-readable medium storing a set of instructions for wireless communication, the set of instructions comprising one or more instructions that, when executed by one or more processors of a device, cause the device to perform the method of one or more of Aspects 1-31.

Aspect 66: An apparatus for wireless communication at a device, comprising a processor; memory coupled with the processor; and instructions stored in the memory and executable by the processor to cause the apparatus to perform the method of one or more of Aspects 32-60.

Aspect 67: A device for wireless communication, comprising a memory and one or more processors coupled to the memory, the one or more processors configured to perform the method of one or more of Aspects 32-60.

Aspect 68: An apparatus for wireless communication, comprising at least one means for performing the method of one or more of Aspects 32-60.

Aspect 69: A non-transitory computer-readable medium storing code for wireless communication, the code comprising instructions executable by a processor to perform the method of one or more of Aspects 32-60.

Aspect 70: A non-transitory computer-readable medium storing a set of instructions for wireless communication, the set of instructions comprising one or more instructions that, when executed by one or more processors of a device, cause the device to perform the method of one or more of Aspects 32-60.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network node, downlink control information (DCI) that indicates resource allocations for transmitting multiple sidelink transport blocks (TBs) and a plurality of receiving UEs associated with the multiple sidelink TBs,
         wherein the DCI specifies a respective receiving UE, of the plurality of receiving UEs, for each sidelink TB of the multiple sidelink TBs, and
         wherein a respective resource allocation for each sidelink TB, of the multiple sidelink TBs, is indicated in the DCI in a reading position associated with the respective receiving UE;
      determine the respective receiving UE for the respective resource allocation based at least in part on the reading position, associated with the respective receiving UE, in the DCI; and
      transmit one or more sidelink TBs of the multiple sidelink TBs based at least in part on the resource allocations and the plurality of receiving UEs.

2. The UE of claim 1, wherein the resource allocations include one or more resource allocations for transmissions of the multiple sidelink TBs from the UE to one or more indicated receiving UEs, and wherein the one or more processors, to transmit the one or more sidelink TBs based at least in part on the resource allocations and the plurality of receiving UEs, are configured to:
   transmit, to the one or more indicated receiving UEs, the multiple sidelink TBs based at least in part on the resource allocations.

3. The UE of claim 1, wherein the one or more processors, to transmit the one or more sidelink TBs, are configured to:
   transmit each sidelink TB, of the multiple sidelink TBs, to the respective receiving UE based at least in part on the respective resource allocation.

4. The UE of claim 1, wherein the DCI includes, for each sidelink TB, of the multiple sidelink TBs, an indication of a respective receiving UE identifier corresponding to the respective receiving UE.

5. The UE of claim 1, wherein the DCI is scrambled using a cyclic redundancy check sequence associated with a group of UEs, and wherein the DCI identifies the respective receiving UE for each sidelink TB, of the multiple sidelink TBs, from the group of UEs.

6. The UE of claim 1, wherein a control channel element index associated with the DCI corresponds to a group of UEs, and wherein the DCI identifies the respective receiving UE for each sidelink TB, of the multiple sidelink TBs, from the group of UEs.

7. The UE of claim 1, wherein the resource allocations include resource allocations for transmissions of the multiple sidelink TBs from the UE.

8. The UE of claim 1, wherein the resource allocations include resource allocations for transmissions of the multiple sidelink TBs from a plurality of transmitting UEs, and wherein the DCI indicates the respective receiving UE, of the plurality of receiving UEs, and a respective transmitting UE, of the plurality of transmitting UEs, for each sidelink TB of the multiple sidelink TBs.

9. The UE of claim 1, wherein the resource allocations are dynamic grant resource allocations for transmitting the multiple sidelink TBs, and wherein the DCI includes, for each sidelink TB, of the multiple sidelink TBs, respective indications of a resource pool, a modulation and coding scheme, a time gap, a time domain frequency allocation, a frequency domain resource allocation, and a new data indicator.

10. The UE of claim 1, wherein the resource allocations are dynamic grant resource allocations for transmitting the multiple sidelink TBs, wherein the DCI indicates a common resource pool and time gap for the multiple sidelink TBs, and wherein the DCI indicates a respective modulation and coding scheme, a respective time domain resource allocation, and a respective frequency domain resource allocation for each sidelink TB of the multiple sidelink TBs.

11. The UE of claim 1, wherein the resource allocations are dynamic grant resource allocations for transmitting the multiple sidelink TBs, wherein the DCI indicates a common time domain resource allocation and frequency domain resource allocation for the multiple sidelink TBs, and wherein the DCI indicates at least one of a time domain multiplexing pattern, a frequency domain multiplexing pattern, or a spatial domain multiplexing pattern for transmitting the multiple sidelink TBs in the common time domain resource allocation and frequency domain resource allocation.

12. The UE of claim 1, wherein the resource allocations include multiple configured grant resource allocations for periodic transmissions of the multiple sidelink TBs.

13. The UE of claim 12, wherein the DCI indicates a respective configured grant configuration index, a respective time domain resource allocation, and a respective frequency domain resource allocation for each configured grant resource allocation of the multiple configured grant resource allocations.

14. The UE of claim 12, wherein the DCI indicates a common time domain resource allocation and frequency domain resource allocation for the multiple configured grant resource allocations, wherein the DCI indicates a respective configured grant configuration index and at least one of a time division multiplexing pattern, a frequency division multiplexing pattern, or a space division multiplexing pattern for each configured grant resource allocation of the multiple configured grant resource allocations.

15. The UE of claim 12, wherein the DCI indicates a common configured grant configuration index for the multiple configured grant resource allocations, and wherein the DCI indicates at least one of:
- a respective time domain resource allocation and a respective frequency domain resource allocation for each configured grant resource allocation of the multiple configured grant resource allocations, or
- a common time domain resource allocation and frequency domain resource allocation for the multiple configured grant resource allocations, and at least one of a time division multiplexing pattern, a frequency division multiplexing pattern, or a space division multiplexing pattern for each configured grant resource allocation of the multiple configured grant resource allocations.

16. The UE of claim 1, wherein the one or more processors are further configured to:
transmit, to the network node, physical uplink control channel (PUCCH) feedback associated with transmitting the one or more sidelink TBs based at least in part on an indication, included in the DCI, of a PUCCH resource and a timing for the PUCCH feedback.

17. The UE of claim 16, wherein the indication of the PUCCH resource and the timing for the PUCCH feedback includes an indication that identifies multiple PUCCH resources and timings for PUCCH feedback associated with the multiple sidelink TBs.

18. The UE of claim 16, wherein the DCI includes a respective indication of the PUCCH resource and the timing for the PUCCH feedback for each sidelink TB of the multiple sidelink TBs.

19. The UE of claim 16, wherein the indication of the PUCCH resource and the timing for the PUCCH feedback includes an indication of a PUCCH resource and a timing for aggregated PUCCH feedback for the one or more sidelink TBs, and wherein the one or more processors, to transmit the PUCCH feedback, are configured to:
transmit, to the network node, the aggregated PUCCH feedback for the one or more sidelink TBs based at least in part on the indication of the PUCCH resource and the timing for the aggregated PUCCH feedback.

20. A network node for wireless communication, comprising:
one or more memories; and
one or more processors, coupled to the one or more memories, configured to:
transmit, to one or more user equipments (UEs), downlink control information (DCI) that indicates resource allocations for transmissions of multiple sidelink transport blocks (TBs) and a plurality of receiving UEs associated with the multiple sidelink TBs,
wherein the DCI specifies a respective receiving UE, of the plurality of receiving UEs, for each sidelink TB of the multiple sidelink TBs, and
wherein a respective resource allocation for each sidelink TB, of the multiple sidelink TBs, is indicated in the DCI in a reading position associated with the respective receiving UE; and
receive physical uplink control channel (PUCCH) feedback associated with the transmissions of the multiple sidelink TBs,
wherein a transmission of each sidelink TB, of the multiple sidelink TBs, is to the respective receiving UE for the respective resource allocation based at least in part on the reading position, associated with the respective receiving UE, in the DCI.

21. The network node of claim 20, wherein the resource allocations are dynamic grant resource allocations for transmitting the multiple sidelink TBs, and wherein the DCI includes, for each sidelink TB, of the multiple sidelink TBs, respective indications of a resource pool, a modulation and coding scheme, a time gap, a time domain frequency allocation, a frequency domain resource allocation, and a new data indicator.

22. The network node of claim 20, wherein the resource allocations are dynamic grant resource allocations for transmitting the multiple sidelink TBs, wherein the DCI indicates a common resource pool and time gap for the multiple sidelink TBs, and wherein the DCI indicates a respective modulation and coding scheme, a respective time domain resource allocation, and a respective frequency domain resource allocation for each sidelink TB of the multiple sidelink TBs.

23. The network node of claim 20, wherein the resource allocations are dynamic grant resource allocations for transmitting the multiple sidelink TBs, wherein the DCI indicates a common time domain resource allocation and frequency domain resource allocation for the multiple sidelink TBs, and wherein the DCI indicates at least one of a time domain multiplexing pattern, a frequency domain multiplexing pattern, or a spatial domain multiplexing pattern for transmitting the multiple sidelink TBs in the common time domain resource allocation and frequency domain resource allocation.

24. The network node of claim 20, wherein the resource allocations include multiple configured grant resource allocations for periodic transmissions of the multiple sidelink TBs, and wherein the DCI indicates a respective configured grant configuration index, a respective time domain resource allocation, and a respective frequency domain resource allocation for each configured grant resource allocation of the multiple configured grant resource allocations.

25. The network node of claim 20, wherein the resource allocations include multiple configured grant resource allocations for periodic transmissions of the multiple sidelink TBs, wherein the DCI indicates a common time domain resource allocation and frequency domain resource allocation for the multiple configured grant resource allocations, wherein the DCI indicates a respective configured grant configuration index and at least one of a time division multiplexing pattern, a frequency division multiplexing pattern, or a space division multiplexing pattern for each configured grant resource allocation of the multiple configured grant resource allocations.

26. The network node of claim 20, wherein the resource allocations include multiple configured grant resource allocations for periodic transmissions of the multiple sidelink TBs, wherein the DCI indicates a common configured grant configuration index for the multiple configured grant resource allocations, and wherein the DCI indicates at least one of:
- a respective time domain resource allocation and a respective frequency domain resource allocation for each configured grant resource allocation of the multiple configured grant resource allocations, or
- a common time domain resource allocation and frequency domain resource allocation for the multiple configured grant resource allocations, and at least one of a time division multiplexing pattern, a frequency division multiplexing pattern, or a space division multiplexing pattern for each configured grant resource allocation of the multiple configured grant resource allocations.

27. The network node of claim 20, wherein the one or more processors, to receive the PUCCH feedback associated with the transmissions of the multiple sidelink TBs, are configured to:
- receive, from the one or more UEs, the PUCCH feedback associated with the transmissions of the multiple sidelink TBs in accordance with at least one indication, included in the DCI, of a PUCCH resource and a timing for the PUCCH feedback.

28. A method of wireless communication performed by a user equipment (UE), comprising:
- receiving, from a network node, downlink control information (DCI) that indicates resource allocations for transmitting multiple sidelink transport blocks (TBs) and a plurality of receiving UEs associated with the multiple sidelink TBs,
  - wherein the DCI specifies a respective receiving UE, of the plurality of receiving UEs, for each sidelink TB of the multiple sidelink TBs, and
  - wherein a respective resource allocation for each sidelink TB, of the multiple sidelink TBs, is indicated in the DCI in a reading position associated with the respective receiving UE;
- determining the respective receiving UE for the respective resource allocation based at least in part on the reading position, associated with the respective receiving UE, in the DCI; and
- transmitting one or more sidelink TBs of the multiple sidelink TBs based at least in part on the resource allocations and the plurality of receiving UEs.

29. A method of wireless communication performed by a network node, comprising:
- transmitting, to one or more user equipments (UEs), downlink control information (DCI) that indicates resource allocations for transmissions of multiple sidelink transport blocks (TBs) and a plurality of receiving UEs associated with the multiple sidelink TBs,
  - wherein the DCI specifies a respective receiving UE, of the plurality of receiving UEs, for each sidelink TB of the multiple sidelink TBs, and
  - wherein a respective resource allocation for each sidelink TB, of the multiple sidelink TBs, is indicated in the DCI in a reading position associated with the respective receiving UE; and
- receiving physical uplink control channel (PUCCH) feedback associated with the transmissions of the multiple sidelink TBs,
  - wherein a transmission of each sidelink TB, of the multiple sidelink TBs, is to the respective receiving UE for the respective resource allocation based at least in part on the reading position, associated with the respective receiving UE, in the DCI.

30. The method of claim 28, wherein transmitting the one or more sidelink TBs comprises:
- transmitting each sidelink TB, of the multiple sidelink TBs, to the respective receiving UE based at least in part on the respective resource allocation.

* * * * *